US012307432B2

(12) United States Patent
Chandrasekaran et al.

(10) Patent No.: US 12,307,432 B2
(45) Date of Patent: May 20, 2025

(54) IDENTIFYING CONSUMERS IN A TRANSACTION VIA FACIAL RECOGNITION

(71) Applicant: Google LLC, Mountain View, CA (US)

(72) Inventors: Sashikanth Chandrasekaran, Belmont, CA (US); Dmitry Kalenichenko, Marina del Rey, CA (US); Timothy Raymond Zwiebel, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 1 day.

(21) Appl. No.: 18/322,197

(22) Filed: May 23, 2023

(65) Prior Publication Data

US 2023/0419288 A1 Dec. 28, 2023

Related U.S. Application Data

(63) Continuation of application No. 16/936,783, filed on Jul. 23, 2020, now Pat. No. 11,694,175, which is a
(Continued)

(51) Int. Cl.
*G06Q 20/00* (2012.01)
*G06Q 20/20* (2012.01)
(Continued)

(52) U.S. Cl.
CPC ......... *G06Q 20/202* (2013.01); *G06Q 20/206* (2013.01); *G06Q 20/3224* (2013.01);
(Continued)

(58) Field of Classification Search
CPC ... G06Q 20/202; G06Q 20/206; G06V 40/167
See application file for complete search history.

(56) References Cited

U.S. PATENT DOCUMENTS 6,522,772 B1 2/2003 Morrison et al.
8,254,647 B1 8/2012 Nechyba et al.
(Continued)

FOREIGN PATENT DOCUMENTS

AU 2017101062 8/2017
EP 2963615 1/2016
(Continued)

OTHER PUBLICATIONS

Berthon, International Search Report and Written Opinion issued PCT/US2016/029898, mailed on Jul. 22, 2016, 12 pages.
(Continued)

*Primary Examiner* — Rokib Masud
(74) *Attorney, Agent, or Firm* — DORITY & MANNING P.A.

(57) ABSTRACT

A merchant and a user register with a payment processing system, which establishes a facial template based on a user image. The user signs into a payment application via a user computing device, which receives an identifier from a merchant beacon device to transmit to the payment processing system. The payment processing system transmits facial templates to the merchant camera device for other users who are also signed in to the payment application in range of the merchant beacon device. The merchant camera device compares a captured facial image against the received facial templates to identify the user. A merchant POS device operator selects an account of the user. The merchant POS device transmits transaction details to the payment processing system, which processes the transaction with an issuer system. The payment processing system receives an approval of the transaction authorization request and transmits a receipt to the merchant POS device.

20 Claims, 15 Drawing Sheets

Related U.S. Application Data continuation of application No. 15/462,772, filed on Mar. 17, 2017, now Pat. No. 10,726,407, which is a continuation of application No. 14/701,517, filed on Apr. 30, 2015, now Pat. No. 9,619,803.

(51) Int. Cl.
    *G06Q 20/32*   (2012.01)
    *G06Q 20/40*   (2012.01)
    *G06T 7/73*    (2017.01)
    *G06V 20/40*   (2022.01)
    *G06V 40/16*   (2022.01)

(52) U.S. Cl.
    CPC ......... *G06Q 20/40145* (2013.01); *G06T 7/74* (2017.01); *G06V 20/46* (2022.01); *G06V 40/166* (2022.01); *G06V 40/167* (2022.01); *G06V 40/172* (2022.01); *G06T 2207/10016* (2013.01); *G06T 2207/30201* (2013.01); *G06T 2207/30232* (2013.01)

(56) References Cited

U.S. PATENT DOCUMENTS

| | | | |
|---|---|---|---|
| 8,577,810 B1* | 11/2013 | Dalit | G06Q 20/20 705/16 |
| 9,202,245 B2 | 12/2015 | Kostka et al. | |
| 9,229,623 B1 | 1/2016 | Penilla et al. | |
| 9,619,803 B2 | 4/2017 | Chandrasekaran et al. | |
| 9,747,587 B2 | 8/2017 | Diehl | |
| 9,770,206 B2 | 9/2017 | Ashokan | |
| 9,881,303 B2 | 1/2018 | Vohra | |
| 9,972,004 B1 | 5/2018 | Donavalli et al. | |
| 9,998,863 B2 | 6/2018 | Mycek et al. | |
| 2003/0046237 A1* | 3/2003 | Uberti | G06Q 20/4014 705/44 |
| 2005/0055582 A1* | 3/2005 | Bazakos | G06F 21/35 726/19 |
| 2005/0165667 A1 | 7/2005 | Cox | |
| 2006/0160525 A1* | 7/2006 | Watanabe | G06Q 20/20 455/411 |
| 2007/0278795 A1 | 12/2007 | Berkson | |
| 2009/0005987 A1 | 1/2009 | Vengroff | |
| 2009/0313129 A1 | 12/2009 | Rothschild | |
| 2010/0211966 A1 | 8/2010 | Zhang et al. | |
| 2011/0170739 A1 | 7/2011 | Gillam et al. | |
| 2011/0178883 A1 | 7/2011 | Gransbery et al. | |
| 2011/0190055 A1 | 8/2011 | Leyvand et al. | |
| 2011/0238510 A1 | 9/2011 | Rowen et al. | |
| 2011/0257985 A1 | 10/2011 | Goldstein | |
| 2011/0307403 A1 | 12/2011 | Rostampour et al. | |
| 2012/0310736 A1 | 12/2012 | Vengroff et al. | |
| 2013/0035979 A1 | 2/2013 | Tenbrock | |
| 2013/0159119 A1 | 6/2013 | Henderson et al. | |
| 2013/0223696 A1 | 8/2013 | Azar et al. | |
| 2013/0251216 A1* | 9/2013 | Smowton | G06V 40/67 713/150 |
| 2014/0067649 A1 | 3/2014 | Kannan et al. | |
| 2014/0165187 A1 | 6/2014 | Daesung et al. | |
| 2014/0222596 A1 | 8/2014 | Smowton | |
| 2014/0289833 A1 | 9/2014 | Briceno et al. | |
| 2014/0289834 A1 | 9/2014 | Lindemann | |
| 2014/0372128 A1 | 12/2014 | Sheets et al. | |
| 2015/0046990 A1 | 2/2015 | Oberheide et al. | |
| 2015/0066671 A1 | 3/2015 | Nichols et al. | |
| 2015/0072618 A1 | 3/2015 | Granbery | |
| 2015/0073907 A1 | 3/2015 | Purves et al. | |
| 2015/0073980 A1 | 3/2015 | Griffin | |
| 2015/0079942 A1 | 3/2015 | Kostka et al. | |
| 2015/0120473 A1 | 4/2015 | Jung et al. | |
| 2015/0161417 A1 | 6/2015 | Kaplan et al. | |
| 2015/0261787 A1 | 9/2015 | Hu et al. | |
| 2015/0278795 A1 | 10/2015 | Jiang et al. | |
| 2015/0309569 A1 | 10/2015 | Kohlhoff et al. | |
| 2015/0332258 A1 | 11/2015 | Kurabi et al. | |
| 2015/0356563 A1 | 12/2015 | Vohra et al. | |
| 2016/0012414 A1 | 1/2016 | Chitilian et al. | |
| 2016/0014406 A1 | 1/2016 | Takahashi et al. | |
| 2016/0027073 A1 | 1/2016 | Eramian | |
| 2016/0042346 A1 | 2/2016 | Pastore et al. | |
| 2016/0063496 A1 | 3/2016 | Royyuru et al. | |
| 2016/0072915 A1 | 3/2016 | Deccane | |
| 2016/0180150 A1 | 6/2016 | Negi et al. | |
| 2016/0253656 A1 | 9/2016 | Dragushan et al. | |
| 2016/0321633 A1 | 11/2016 | Chandrasekaran et al. | |
| 2016/0321671 A1 | 11/2016 | Chandrasekaran et al. | |
| 2016/0323274 A1 | 11/2016 | Chandrasekaran et al. | |
| 2017/0004507 A1 | 1/2017 | Hendersen et al. | |
| 2017/0164159 A1 | 6/2017 | Mycek et al. | |
| 2018/0114219 A1 | 4/2018 | Setchell et al. | |
| 2018/0255433 A1 | 9/2018 | Mycek et al. | |
| 2018/0349939 A1 | 12/2018 | Setchell et al. | |
| 2019/0364039 A1 | 11/2019 | Chandrasekaran et al. | |

FOREIGN PATENT DOCUMENTS

| | | |
|---|---|---|
| GB | 2368951 | 5/2002 |
| GB | 2513173 | 10/2014 |
| WO | WO 2016/176517 A1 | 11/2016 |
| WO | WO 2016/176517 A8 | 11/2016 |
| WO | WO 2017/004602 | 1/2017 |
| WO | WO 2018/075227 | 4/2018 |
| WO | WO 2018/222232 | 12/2018 |

OTHER PUBLICATIONS

Berthon, International Search Report and Written Opinion issued in PCT/US2018,018443, mailed on Apr. 20, 2018, 14 pages.

Choi, US Office Action issued in copending U.S. Appl. No. 15/299,444, filed Oct. 20, 2016, mailed on Aug. 5, 2019, 18 pages.

Choi, US Office Action issued in copending U.S. Appl. No. 15/299,444, filed Oct. 20, 2016, mailed on Mar. 5, 2019, 14 pages.

Crawley, US Office Action issued in copending U.S. Appl. No. 15/791,239, mailed on Oct. 30, 2019, 21 pages.

Crawley, US Office Action issued in copending U.S. Appl. No. 14/791,239, mailed on Jun. 11, 2019, 22 pages.

Crawley, US Office Action issued in copending U.S. Appl. No. 14/791,239 mailed on Sep. 18, 2018, 25 pages.

Crawley, US Office Action issued in copending U.S. Appl. No. 14/791,239, mailed on May 24, 2017, 29 pages.

Crawley, US Office Action issued in copending U.S. Appl. No. 14/791,239, mailed on Oct. 13, 2017, 30 pages.

Crawley, US Office Action issued in copending U.S. Appl. No. 14/791,239, mailed on Oct. 5, 2016, 18 pages.

Crawley, US Office Action issued in copending U.S. Appl. No. 14/791,239, mailed on May 16, 2018, 29 pages.

Danzig, US Office Action issued in copending U.S. Appl. No. 15/143,451, mailed on Apr. 11, 2019, 15 pages.

Danzig, US Office Action issued in copending U.S. Appl. No. 15/143,451, mailed on Oct. 16. 2109, 22 pages.

German Office Action issued in German Application No. 11-2016-001971.8, mailed on Mar. 27, 2019, 11 pages.

Keoh-Lehmann, International Search Report and Written Opinion issued in PCT/US2016/040881, mailed on Aug. 26, 2016, 14 pages.

Lander, UK Office Action received for UK Patent Application No. 1715687.8, mailed on Oct. 21, 2019, 2 pages.

Lander, UK Office Action for UK Patent Application No. 1715687.8, mailed on Jan. 16, 2018, 5 pages.

Lander, UK Office Action for UK Patent Application No. 1715687.8, mailed on Jan. 10, 2019, 14 pages.

Lander, UK Office Action for UK Patent Application No. 1715687.8, mailed on Aug. 17, 2018,6 pages.

Lander, UK Office Action for UK Patent Application No. 1715687.8, mailed on Oct. 31, 2017, 7 pages.

Linder, UK Office Action for UK Patent Application No. 1715687.8, mailed on May 25, 2018, 8 pages.

McCoy, US Office Action issued in copending U.S. Appl. No. 15/142,453 mailed on Oct. 29, 2018, 18 pages.

(56) References Cited

OTHER PUBLICATIONS

McCoy, US Office Action issued in copending U.S. Appl. No. 15/143,453, mailed on Jun. 29, 2018, 16 pages.
McCoy, US Office Action issued in copending U.S. Appl. No. 15/143,453, mailed on Nov. 27, 2017, 11 pages.
Moon, International Preliminary Report on Patentability issued in International Application No. PCT/US2016/029898, mailed on Nov. 9, 2017, 9 pages,.
Nickitas-Etienne, International Preliminary Report on Patentability issued in PCT/US2016/040881, mailed on Jan. 11, 2018, 10 pages.
Sinsky "Square Introduces Hands-free Payment.", CNET, Nov. 2, 2011, 4 pages.
Thielemann, European Office Action issued in European Application No. 16738639.0, mailed on Aug. 9, 2019, 4 pages.
Ullah Masud, US Office Action issued in copending U.S. Appl. No. 14/701,517, mailed on Jun. 15, 2016, 11 pages.
Van der Weiden, International Search Report and Written Opinion for PCT/US2017/054621, mailed on Nov. 29, 2017, 13 pages.
Wittmann-Regis, International Preliminary Report on Patentability issued in International Application No. PCT/US2017/054621, mailed on May 2, 2019, 7 pages.

\* cited by examiner

280

Identifying, by a payment processing system, a user via voice recognition

1210 Merchant camera device transmits notice that user cannot be identified to payment processing system

1220 Payment processing system retrieves audio templates corresponding to users from current customer log

1230 Payment processing system transmits request to merchant system point of sale device to record audio of user

1240 Merchant system point of sale displays request for user to record audio

1250 Merchant system point of sale device records voice input of the user and transmits the voice input to the payment processing system

1260 Payment processing system compares received voice input against retrieved audio templates corresponding to users from current customer log

1270 match? — No → 290, Fig. 2

Yes ↓

1280 Payment processing system assigns identified user to merchant point of sale device in current customer log 295, Fig. 2

Figure 12

IDENTIFYING CONSUMERS IN A TRANSACTION VIA FACIAL RECOGNITION

CROSS REFERENCE TO RELATED APPLICATIONS

The present application is a continuation of U.S. application Ser. No. 16/936,783 having a filing date of Jul. 23, 2020, now U.S. Pat. No. 11,694,175, which is a continuation of U.S. application Ser. No. 15/462,772 having a filing date of Mar. 17, 2017, now U.S. Pat. No. 10,726,407, which is a continuation of U.S. application Ser. No. 14/701,517 having a filing date of Apr. 30, 2015, now U.S. Pat. No. 9,619,803. Applicant claims priority to and the benefit of each of such applications and incorporates all such applications herein by reference in its entirety.

TECHNICAL FIELD

The present disclosure relates to improving user convenience in transactions by identifying user accounts for use in transactions based on facial recognition of users by a payment processing system.

BACKGROUND

When consumers make purchases at a merchant location, many methods of conducting a transaction are available. Consumers may use many different cards or accounts for purchases, such as gift cards, debit cards, credit cards, stored value cards, and other cards or accounts. The user account identifiers and other data represented by the cards may be communicated to the merchant system via magnetic stripes, near field communication technologies involving user computing devices, and other suitable mechanisms.

Current applications for conducting transactions at a merchant location do not provide the opportunity for the consumer to make a hands-free transaction. Additionally, current applications require the consumer to perform actions to identify himself by providing user account identifiers or other data to the merchant system.

SUMMARY

Techniques herein provide computer-implemented methods to conduct a hands-free transaction with facial recognition of a user. In an example embodiment, a merchant registers with a payment processing system. A user establishes an account with the payment processing system and transmits an image of himself to the payment processing system to establish a facial template associated with the user account. A user signs into the payment application via the user computing device and enters the merchant system location. The user computing device receives a merchant beacon device identifier from the merchant beacon device and transmits the identifier to the payment processing system. The payment processing system transmits facial templates to the merchant camera device corresponding to other users whose user computing devices are in network range of the merchant beacon device and who are signed in to the payment application. The merchant camera device captures a facial image of the user and identifies the user by comparing the captured facial image against the received facial templates. The merchant point of sale device operator selects an account of the user for use in a transaction from one or more displayed accounts of the user. The merchant point of sale device transmits transaction details to the payment processing system, which generates a transaction authorization request to transmit to an issuer system associated with the user account selected for use in the transaction. The payment processing system receives an approval of the transaction authorization request and transmits a receipt to the merchant point of sale device.

In certain other example aspects described herein, systems and computer program products to conduct a hands-free transaction with facial recognition of a user are provided.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 12 is a block flow diagram depicting a method for identifying, by a payment processing system, a user via voice recognition, in accordance with certain example embodiments.

DETAILED DESCRIPTION OF EXAMPLE EMBODIMENTS

Overview

Figure 1:
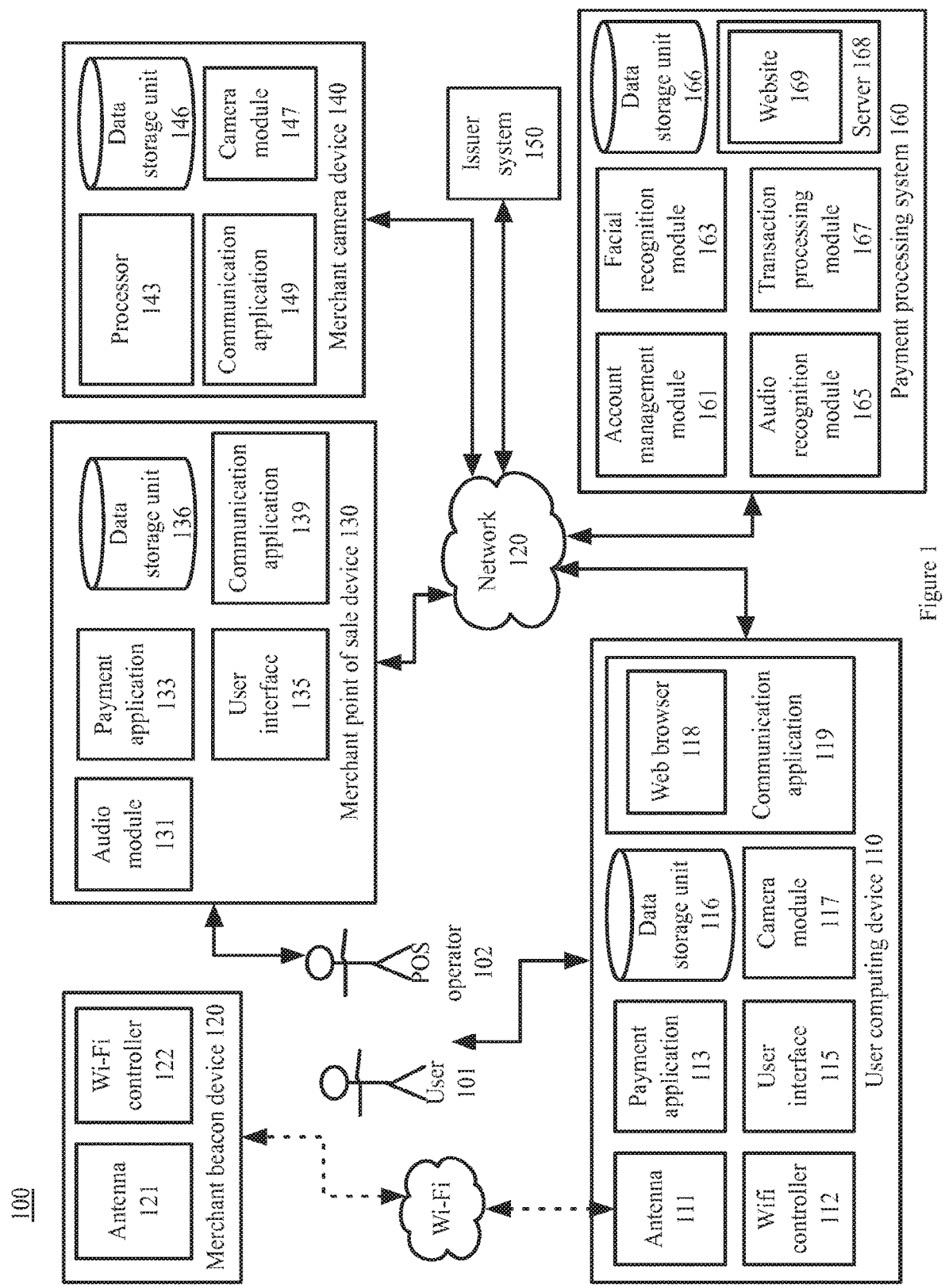
FIG. 1 is a block diagram depicting a system for conducting a hands-free transaction with facial recognition of a user, in accordance with certain example embodiments.

The example embodiments described herein provide computer-implemented techniques for conducting a hands-free transaction with facial recognition of a user.

In an example embodiment, a merchant registers with a payment processing system. A merchant system installs one or more merchant beacon devices, one or more merchant point of sale devices, and one or more merchant camera devices at a merchant system location. For example, a user establishes an account with the payment processing system and downloads a payment application on a user computing device associated with the user. In an example, the user transmits an image of himself and/or an audio recording of himself to the payment processing system to establish a facial template and/or audio template associated with the user account. A user enters a merchant system location and signs into the payment application via the user computing device. The user computing device receives a merchant beacon device identifier from the merchant beacon device and transmits the identifier to the payment processing system. The payment processing system transmits facial templates to the merchant camera device corresponding to users whose user computing devices are in network range of the merchant beacon device and who are signed in to the payment application. The merchant camera device captures a facial image of the user and identifies the user based on comparing the captured facial image against the received facial templates. Alternatively, the user submits an audio recording to the payment processing system via the merchant point of sale device, which identifies the user based on comparing the received audio recording against audio templates for users. In yet another embodiment, the merchant point of sale device operator identifies the user based on a user's response to a challenge. After identifying the user, the merchant point of sale device displays one or more accounts of the user. The merchant point of sale device operator selects an account of the user for use in a transaction. The merchant point of sale device transmits transaction details to the payment processing system, which generates a transaction authorization request to transmit to an issuer system associated with the user account selected for use in the transaction. The payment processing system receives an approval of the transaction authorization request and transmits a receipt to the merchant point of sale device.

In an example embodiment, a merchant system registers with a payment processing system. A merchant system operator installs a payment application on a merchant point of sale device. In another example, the merchant system operator installs the payment application on a plurality of merchant point of sale devices at a merchant system location. A merchant beacon device receives a beacon identifier code from a payment processing system. For example, the merchant system operator installs one or more merchant beacon devices at the merchant system location. The merchant beacon device broadcasts the merchant beacon identifier code via wireless communication at the merchant system location. The merchant system operator installs a merchant camera device at the merchant system location to correspond to the merchant point of sale device. In another example, a plurality of merchant camera devices are installed at the merchant system location, each merchant camera device corresponding to a particular merchant point of sale device. In yet another example, a particular merchant camera device may correspond to two or more particular merchant point of sale devices. The payment processing system receives a camera device identifier and associates it with a corresponding beacon identifier of the merchant beacon device.

In an example embodiment, the user registers with a payment processing system. For example, the user accesses a payment processing system website via a user computing device associated with the user. The user registers with the payment processing system and downloads a payment application onto the user computing device. In an example embodiment, the payment processing system establishes a facial template associated with the user account. For example, the payment application displays a request for the user to capture a facial image via the user computing device. The user selects an option to capture a facial image. The payment application activates a camera module on the user computing device and the users captures a facial image of himself. The payment processing system receives the facial image. The payment processing system creates a facial template associated with the user account based on the received facial image. The payment processing system deletes the received facial image. In another example embodiment, the payment processing system establishes a audio template associated with the user account. The payment application requests and receives user audio via the user computing device. The payment application creates an audio template associated with the user account based on the received audio of the voice of the user. The payment processing system deletes the received audio of the voice of the user.

The user signs in to a payment application on the user computing device. The user carries the user computing device within a threshold distance of a merchant beacon device at the merchant system location. The user computing device receives a merchant beacon identifier broadcast by the merchant beacon device and transmits the received merchant beacon identifier and a user account identifier to the payment processing system. The payment processing system receives the merchant beacon identifier and the user account identifier. The payment processing system extracts a facial template associated with the user account identifier and identifies a merchant camera device associated with the merchant beacon device identifier.

The payment processing system transmits a facial template of the identified user to the merchant camera device associated with the merchant beacon device identifier. For example, a facial template associated with the identified user's account is transmitted to the merchant camera device. The merchant camera device receives the facial template of the user. The merchant camera device adds the facial template of the user to a current customer log. The merchant camera device periodically updates the current customer log based on updates received from the payment processing system. For example, the payment processing system transmits a subsequent facial template of a subsequent user that, carrying a user computing device via which the user is signed in to the payment application, enters a threshold distance of a merchant beacon device required to establish a wireless network connection. In this example, the payment processing system receives the merchant beacon device identifier transmitted by the user computing device and transmits a facial template of the subsequent user to the merchant camera device. In another example, in response to detecting that the user computing device associated with a user in the current customer log is no longer maintaining a network connection with the merchant beacon device, is no longer observing the merchant beacon device, or is no longer signed in to the payment application, the payment processing system transmits a notice that a user has left a merchant location to the merchant camera device. In this example, the merchant camera device deletes the indicated user from the current customer log.

The user approaches a merchant point of sale device. The merchant point of sale device operator totals items of the user for purchase. The merchant point of sale device operator asks the user to select a payment option. The user directs the merchant point of sale device operator to initiate a transaction via the payment application. For example, as previously discussed, the payment application is installed on both the merchant point of sale device and the user computing device. The merchant point of sale device operator selects an option on the merchant point of sale device to initiate a transaction using the payment application. The merchant point of sale device transmits a request to identify the user to the merchant camera device via the payment processing system. In this example, the payment processing system communicates with both the merchant camera device and the merchant point of sale device.

In another example embodiment, the merchant point of sale device receives an indication from the merchant camera device that the user has been identified and the merchant point of sale device displays an option for the user to initiate a transaction using the payment application. For example, the merchant point of sale device may receive an indication that the user has been identified directly from the merchant camera device over a network. In another example, the merchant camera device transmits an indication that the user has been identified to the payment processing system and the payment processing system then transmits the indication that the user has been identified to the merchant point of sale device. In these example embodiments, the merchant point of sale device operator, in response to the merchant point of sale device displaying an option to initiate a transaction using the payment application, asks the user whether the user would like to initiate a transaction using the payment application. In these example embodiment, the user directs the merchant point of sale device operator to initiate the transaction via the payment application and the merchant point of sale operator selects the corresponding option on the merchant point of sale device user interface.

The merchant camera device captures video of the user. For example, the user is positioned in front of the point of sale device and the merchant camera device is positioned to be able to capture a video of the user's face. In an example embodiment, the merchant camera device starts capturing video of the user only when the camera device receives a request to identify the user. For example, the merchant camera device receives a request to identify the user from the payment processing system or from the merchant point of sale device. In another example embodiment, the merchant camera device starts capturing video when the merchant camera device receives an indication from the payment processing system that a user computing device associated with the user has established a network connection with the merchant beacon device. In this example embodiment, the merchant camera device does not capture video when there are no users with associated user computing devices within network range of the merchant beacon device. The merchant camera device extracts a facial image of the user from the captured video and generates a facial template from the captured facial image. The merchant camera device deletes the captured video and extracted facial image. The merchant camera device retrieves facial templates from the current customer log. For example, the current customer log comprises a list of users and associated facial templates for users associated with user computing devices that have currently established a network connection with a merchant beacon device at the merchant system location. In an example embodiment, the current customer log comprises volatile or transient memory. For example, the current customer log is not saved and user information is added or deleted from the current customer log as user computing devices associated with respective users enter or leave a network range of the merchant beacon device. The merchant camera device compares the generated facial template from the extracted facial image to facial templates from the current customer log. The merchant camera device is able to identify the user if there is a match between a facial template from the current customer log and the generated facial template. The merchant camera device is unable to identify the user if there is no match between a facial template from the current customer log and the generated facial template. If the merchant camera device is able to identify the user, the merchant camera device notifies the payment processing system of the identity of the user. In another example embodiment, if the merchant camera device is able to identify the user, the merchant camera device notifies the merchant point of sale device of the identity of the user.

If the merchant camera device is unable to identify the user based on facial recognition, the merchant camera device notifies the payment processing system that the user cannot be identified based on facial recognition. In an example embodiment, if the user cannot be identified based on facial recognition, the payment processing system identifies the user based on audio recognition. In another example embodiment, the payment processing system does not identify users based on audio recognition. In an example embodiment, if the payment processing identifies users based on audio recognition, the payment processing system retrieves audio templates corresponding to users from the current customer log. The payment processing system transmits a request to the merchant system point of sale device to record an audio of the user. The merchant system point of sale device displays a request for the user to record audio, records a voice input of the user, and transmits the voice input to the payment processing system. The payment processing system compares the received voice input against the retrieved audio templates corresponding to users from the current customer log. The payment processing system is able to identify the user if there is a match between a audio template from the current customer log and the received voice input of the user. The payment processing system is unable to identify the user if there is no match between an audio template from the current customer log and the received voice input of the user.

If the payment processing system is unable to identify the user based on voice recognition, the merchant point of sale device operator is notified by the payment processing system to issue a challenge to the user. The user provides a challenge response and the merchant point of sale operator inputs the response into the merchant point of sale device. The merchant point of sale device displays potential users based on the challenge response. For example, the merchant point of sale device transmits the response to the payment processing system and the payment processing system accesses a database comprising a list or table that associates challenges with corresponding responses and users. In this example, the payment processing system identifies the user by correlating the challenge and the response to identify one or more users in the database. In this example, the payment processing system transmits the one or more identified users to the merchant point of sale device. In this example, the merchant point of sale device displays the one or more identified users to the merchant point of sale device operator. The merchant point of sale device operator selects a user. In an example, the merchant point of sale device operator may compare a visual image or name of the user displayed on the user computing device to the visual appearance of the current customer at the merchant point of sale device and/or documentation presented by the user to the merchant point of sale operator. In an example, the merchant point of sale device transmits the identity of the user identified by the merchant point of sale operator.

The point of sale device displays accounts of the identified user. For example, after receiving the identity of the user from the merchant camera device, receiving the identity of the user from the merchant point of sale device, or identifying the user, the payment processing system transmits information associated with one or more accounts of the identified user. The merchant point of sale device operator selects a user account for transaction and confirms the transaction with permission of the user. The merchant point of sale device transmits transaction details to the payment processing system. For example, transaction details may comprise a total amount of the transaction, a selected user account for use in the transaction, an account of the merchant for use in the transaction, and other useful or relevant information. The payment processing system transmits a transaction authorization request to an issuer system. For example, the issuer system is associated with the user account selected for use in the transaction. The issuer system approves the transaction authorization request and transmits a transaction authorization approval to the payment processing system. The payment processing system transmits a transaction receipt to the merchant point of sale device.

By using and relying on the methods and systems described herein, the payment processing system, the merchant camera device, the merchant beacon device, the user computing device, and the merchant point of sale device enable the user to conduct a transaction with the merchant system without the user having to interact with the user computing device or produce identity documents or physical payment cards, as required in some current technology. As such, the systems and methods described herein may reduce the inputs required by the user via the user computing device and the inputs required by the merchant point of sale device operator to identify the user.

Example System Architecture

Turning now to the drawings, in which like numerals indicate like (but not necessarily identical) elements throughout the figures, example embodiments are described in detail.

FIG. 1 is a block diagram depicting a system 100 for conducting a hands-free transaction with facial recognition of a user 101, in accordance with certain example embodiments. As depicted in FIG. 1, the system 100 includes network computing devices 110, 130, 140, 150, and 160 that are configured to communicate with one another via one or more networks 120. In some embodiments, a user associated with a device must install an application and/or make a feature selection to obtain the benefits of the techniques described herein.

In example embodiments, the network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 130, 140, 150, and 160 includes a device having a communication module capable of transmitting and receiving data over the network 120. For example, each network computing device 110, 130, 140, 150, and 160 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 130, 140, 150, and 160 are operated by users 101, merchant beacon device 120 operators, merchant point of sale ("POS") device 130 operators, merchant camera device 140 operators, issuer system 150 operators, and payment processing system 160, respectively.

An example user computing device 110 comprises an antenna 111, a Wi-Fi controller 112, a payment application 113, a user interface 115, a data storage unit 116, a camera module 117, a web browser 118, and a communication application 119.

In an example embodiment, the antenna 111 is a means of communication between the user computing device 110 and a merchant beacon device 120. In an example embodiment, a Wi-Fi controller 112 outputs through the antenna 111 a radio signal, or listens for radio signals from the merchant beacon device 120. In another example embodiment a Bluetooth controller or a near field communication ("NFC") controller is used. In an example embodiment, the Wi-Fi controller 112 outputs through the antenna 111 a radio signal, or listens for radio signals from the payment card device 120.

In an example embodiment, the Wi-Fi controller 112 is capable of sending and receiving data, performing authentication and ciphering functions, and directing how the user computing device 110 will listen for transmissions from the merchant beacon device 120 or configuring the user computing device 110 into various power-save modes according to Wi-Fi-specified procedures. In another example embodiment, the user computing device 110 comprises a Bluetooth controller or an NFC controller capable of performing similar functions. An example Wi-Fi controller 112 communicates with the payment application 113 and is capable of sending and receiving data over a wireless, Wi-Fi communication channel. In another example embodiment, a Bluetooth controller 112 or NFC controller 112 performs similar functions as the Wi-Fi controller 112 using Bluetooth or NFC protocols. In an example embodiment, the Wi-Fi controller 112 activates the antenna 111 to create a wireless communication channel between the user computing device 110 and the merchant beacon device 120. The user computing device 110 communicates with the merchant beacon device 120 via the antenna 111. In an example embodiment, when the user computing device 110 has been activated, the Wi-Fi controller 112 polls through the antenna 111 a radio signal, or listens for radio signals from the merchant beacon device 120.

In an example embodiment, the payment application 113 is a program, function, routine, applet, or similar entity that exists on and performs its operations on the user computing device 110. In certain example embodiments, the user 101 must install the payment application 113 and/or make a feature selection on the user computing device 110 to obtain the benefits of the techniques described herein. In an example embodiment, the user 101 may access payment application 113 on the user computing device 110 via the user interface 115. In an example embodiment, the payment application 113 may be associated with the payment processing system 160. In another example embodiment, the payment application 113 may be associated with a merchant system associated with the merchant beacon device 120, the merchant point of sale device 130 and the merchant camera device 140. In yet another example embodiment, two payment applications 113 exist, one associated with the merchant system and another associated with the payment processing system 160.

In an example embodiment, the user interface 115 enables the user 101 to interact with the payment application 113 and/or web browser 118. For example, the user interface 115 may be a touch screen, a voice-based interface, or any other interface that allows the user 101 to provide input and receive output from an application or module on the user computing device 110. In an example embodiment, the user 101 interacts via the user interface 115 with the payment application 113 and/or web browser 118 to configure user 101 accounts on the payment processing system 160. In another example embodiment, the user 101 interacts via the user interface 115 with the payment application 113 and/or the web browser 118 to enable hands-free payments, if needed.

In an example embodiment, the data storage unit 116 comprises a local or remote data storage structure accessible to the user computing device 110 suitable for storing information. In an example embodiment, the data storage unit 116 stores encrypted information, such as HTML5 local storage.

In an example embodiment, the camera module 117 may be any module or function of the user computing device 110 that obtains a digital image. The camera module 117 may be resident on the user computing device 110 or in any manner logically connected to the user computing device 110. For example, the camera module 117 may be connected to the user computing device 110 via the network 120. The camera module 117 may be capable of obtaining individual images or a video scan. Any other suitable image capturing device may be represented by the camera module 117.

In an example embodiment, the user 101 can use a communication application 119, such as a web browser 118 application or a stand-alone application, to view, download, upload, or otherwise access documents or web pages via a distributed network 120.

In an example embodiment, the web browser 118 can enable the user 101 to interact with web pages using the user computing device 110. In an example embodiment, the user 101 may access the user's 101 account maintained by the payment processing system 160 via the web browser 118. In another example embodiment, the user 101 may access the a merchant system website via the web browser 118. In certain example embodiments described herein, one or more functions performed by the payment application 113 may also be performed by a web browser 118 application associated with the payment processing system 160.

In an example embodiment, the communication application 119 can interact with web servers or other computing devices connected to the network 120, including the user computing device 110 and a web server of a merchant system.

In certain example embodiments, one or more functions herein described as performed by the payment application 113 may also be performed by a web browser 118 application, for example, a web browser 118 application associated with a merchant system website or associated with the payment processing system 160. In certain example embodiments, one or more functions herein described as performed by the payment application 113 may also be performed by the user computing device 110 operating system. In certain example embodiments, one or more functions herein described as performed via the web browser 118 may also be performed via the payment application 113.

An example merchant beacon device 120 comprises an antenna 121 and a Wi-Fi controller 122. In an example embodiment, a merchant system location comprises one or more merchant beacon devices 120 installed at the merchant system location. In an example embodiment, each installed merchant beacon device 120 is associated by a payment processing system 160 with a particular merchant camera device 140 installed at the merchant location. For example, the payment processing system 160 may comprise a database that correlates merchant beacon device 120 identifiers with merchant camera device 140 identifiers for associated merchant camera devices 140. For example, a merchant camera device 140 identifier may comprise hardware identifier specific to the device such as a serial number or a MAC ID. In another example, a merchant beacon device 120 identifier may comprise a hardware identifier specific to the beacon device or an identifier generated by the payment processing system 160 and stored in the merchant beacon device 120. An example merchant beacon device 120 is programmed to broadcast, emit, or otherwise transmit a particular merchant beacon device 120 identifier over a wireless network 120 to any user computing devices 110 within a threshold distance required to maintain the wireless network 120. For example, the wireless network may comprise a Wi-Fi network 120, a Bluetooth network 120, an NFC network 120, or any other appropriate wireless network 120.

In an example embodiment, the antenna 121 is a means of communication between the user computing device 110 and a merchant beacon device 120. In an example embodiment, a Wi-Fi controller 122 outputs through the antenna 121 a radio signal, or listens for radio signals from the user computing device 110. In another example embodiment a Bluetooth controller or a near field communication ("NFC") controller is used. In an example embodiment, the Wi-Fi controller 122 outputs through the antenna 121 a radio signal, or listens for radio signals from the payment card device 120.

In an example embodiment, the Wi-Fi controller 122 is capable of sending and receiving data, performing authentication and ciphering functions, and directing how merchant beacon device 120 will listen for transmissions from the user computing device 110 or configuring the merchant beacon device 120 into various power-save modes according to Wi-Fi-specified procedures. In another example embodiment, the merchant beacon device 120 comprises a Bluetooth controller or an NFC controller capable of performing similar functions. An example Wi-Fi controller 122 communicates with the payment application 113 and is capable of sending and receiving data over a wireless, Wi-Fi communication channel. In another example embodiment, a Bluetooth controller 122 or NFC controller 122 performs similar functions as the Wi-Fi controller 122 using Bluetooth or NFC protocols. In an example embodiment, the Wi-Fi controller 122 activates the antenna 121 to create a wireless communication channel between the user computing device 110 and the merchant beacon device 120. The merchant beacon device 120 communicates with the user computing device 110 via the antenna 121. In an example embodiment, when the merchant beacon device 120 has been activated, the Wi-Fi controller 122 polls through the antenna 121 a radio signal, or listens for radio signals from the user computing device 110.

An example merchant point of sale device 130 comprises an audio module 131, payment application 133, a user interface 135, a data storage unit 136, and a communication application 139.

In an example embodiment, the audio module 131 may be any module or function of the merchant POS device 130 that captures an audio input of an external environment of the merchant POS device 130. The audio module 131 may be resident on the merchant POS device 130 or in any manner logically connected to the merchant POS device 130. For example, the audio module 131 may be connected to the merchant POS device 130 via the network 120. The audio module 131 may be capable of obtaining an audio recording. Any suitable audio recording device may be represented by the audio module 131.

In an example embodiment, the payment application 133 is a program, function, routine, applet, or similar entity that exists on and performs its operations on the merchant point of sale device 130. In certain example embodiments, the merchant point of sale ("POS") device operator 102 or other merchant system operator must install the payment application 133 and/or make a feature selection on the merchant point of sale device 130 to obtain the benefits of the techniques described herein. In an example embodiment, the merchant POS device operator 102 may access the payment application 133 on the merchant POS device 130 via the user interface 135. In an example embodiment, the payment application 133 may be associated with the payment processing system 160. In another example embodiment, the payment application 133 may be associated with a merchant system associated with the merchant beacon device 120 and the merchant camera device 140. In yet another example embodiment, two payment applications 133 exist, one associated with the merchant system and another associated with the payment processing system 160.

In an example embodiment, the user interface 135 enables the merchant POS device operator 102 to interact with the merchant POS device 130. For example, the user interface 135 may be a touch screen, a voice-based interface, or any other interface that allows the merchant POS device operator 102 to provide input and receive output from an application or module on the merchant POS device 130. In an example embodiment, the merchant POS device operator 102 interacts via the user interface 135 with the payment application 133.

In an example embodiment, the data storage unit 136 comprises a local or remote data storage structure accessible to the merchant POS device 130 suitable for storing information. In an example embodiment, the data storage unit 136 stores encrypted information, such as HTML5 local storage.

In an example embodiment, the communication application 139, such as a web browser application or a stand-alone application, enables an operator of the merchant POS device 130 to view, download, upload, or otherwise access documents or web pages via a distributed network 120. For example, the communication application 139 may enable communication over the network 120 with the payment processing system 160.

An example merchant camera device 140 comprises a processor 143, a data storage unit 146, a camera module 147, and a communication application 149.

In an example embodiment, the processor 143 performs one or more functions described herein as being performed by the merchant camera device 140.

In an example embodiment, the data storage unit 146 comprises a local or remote data storage structure accessible to the merchant camera device 140 suitable for storing information. In an example embodiment, the data storage unit 146 stores encrypted information, such as HTML5 local storage.

In an example embodiment, the camera module 147 may be any module or function of the merchant camera device 140 that captures a video input or captures a digital image of an external environment of the merchant camera device 140. The camera module 147 may be resident on the merchant camera device 140 or in any manner logically connected to the merchant camera device 140. For example, the camera module 147 may be connected to the merchant camera device 140 via the network 120. The camera module 147 may be capable of obtaining individual images or a video scan. Any other suitable image capturing device may be represented by the camera module 147.

In an example embodiment, the communication application 149 enables the merchant camera device 140 to communicate with a server of the payment processing system 160.

An example issuer system 150 approves or denies a payment authorization request received from the payment processing system 160. In an example embodiment, the issuer system 150 communicates with the payment processing system 160 over the network 120. In an example embodiment, the issuer system 150 communicates with an acquirer system to approve a credit authorization and to make payment to the payment processing system 160 and/or merchant system. For example, the acquirer system is a third party payment processing company.

An example payment processing system 160 comprises an account management module 161, a facial recognition module 163, an audio recognition module 165, a data storage unit 166, and a transaction processing module 167.

In an example embodiment, the account management module 161 manages one or more user 101 accounts. In an example embodiment, a user 101 account may comprise a digital wallet account, an email account, a social networking account, or any other appropriate account associated with the payment processing system 160. In an example embodiment, the account management system 161 communicates with a payment application 113 operating on a user computing device 110 associated with a user 101 having a user 101 account with the payment processing system 160. In an example embodiment, the user 101 enters payment account information into the user 101 account via the payment application 113 and the account management module 161 receives the payment account information over the network 120 and associates the received payment account information with the user 101 account.

In an example embodiment, the facial recognition module 163 receives a facial image of a user 101 associated with a user 101 account submitted by the user 101 via the user computing device 110 over the network 120. For example, the user 101 submits the facial image at the time the user 101 establishes the user 101 account with the payment processing system 160. In an example embodiment, the facial recognition module 163 generates a facial template based on a received facial image.

In an example embodiment, the audio recognition module 165 receives a audio recording of a user 101 associated with a user 101 account submitted by the user 101 via the user computing device 110 over the network 120. For example, the user 101 submits the audio recording at the time the user 101 establishes the user 101 account with the payment processing system 160. In an example embodiment, the audio recognition module 165 generates an audio template based on the received audio recording of the user 101. In an example embodiment, the audio recognition module 165 receives a audio recording of a first user 101 and compares the audio recording of the first user 101 against a stored audio template associated with a second user 101.

In an example embodiment, the data storage unit 166 comprises a local or remote data storage structure accessible to the payment processing system 160 suitable for storing information. In an example embodiment, the data storage unit 166 stores encrypted information, such as HTML5 local storage.

In an example embodiment, the transaction processing module 167 receives transaction details from a merchant POS device 130 and a request to initiate a transaction. Example transaction details comprise merchant system account information, a total amount of the transaction, and a user 101 selection of a user 101 payment account associated with the user's 101 account with the payment processing system 160. For example, the user's 101 account is a digital wallet account comprising one or more payment account information corresponding to one or more respective payment accounts of the user 101. In an example embodiment, the transaction processing module 167 extracts payment account information from the user 101 account corresponding to the user 101 selection of the user 101 payment account received in the transaction details from the merchant POS device 130. In an example embodiment, the transaction processing module 167 transmits a payment authorization request to an issuer system 150 or other appropriate financial institution associated with the payment account selected by the user 101 for use in the transaction. An example payment authorization request may comprise merchant system payment account information, user 101 payment account information, and a total amount of the transaction. In an example embodiment, after the issuer system 150 processes the payment authorization request, the transaction processing module 167 receives an approval or denial of the payment authorization request from the issuer system 150 over the network 120. In an example embodiment, the transaction processing module 167 transmits a receipt to the merchant POS device 130 and/or the user computing device 110 comprising a summary of the transaction.

It will be appreciated that the network connections shown are example and other means of establishing a communications link between the computers and devices can be used. Moreover, those having ordinary skill in the art having the benefit of the present disclosure will appreciate that the user computing device 110, the merchant beacon device 120, the merchant point of sale device 130, the merchant camera device 140, the issuer system 150, and the payment processing system 160 illustrated in FIG. 1 can have any of several other suitable computer system configurations. For example, a user computing device 110 embodied as a mobile phone or handheld computer may or may not include all the components described above.

Figure 15:
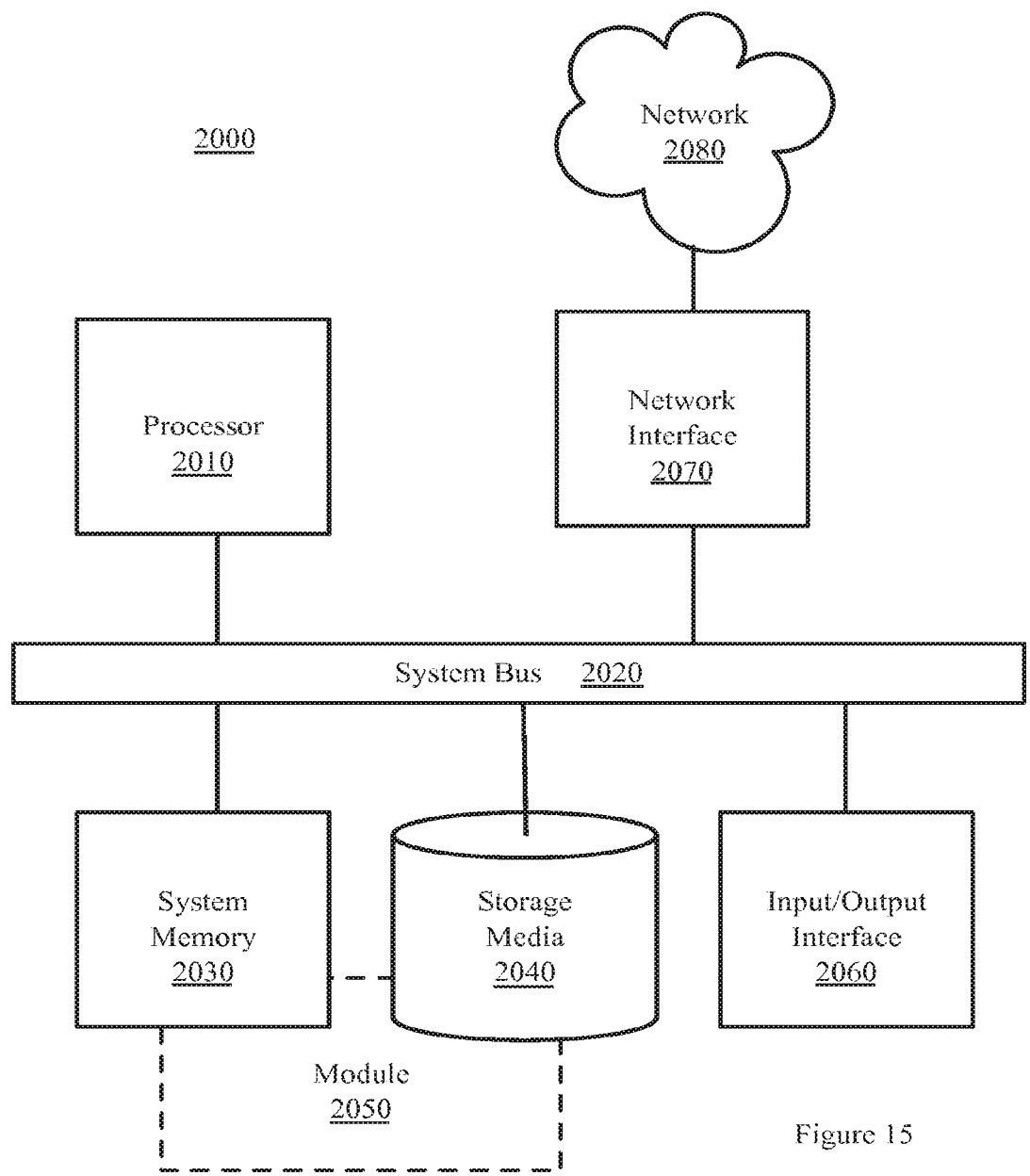
FIG. 15 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 15. Furthermore, any modules associated with any of these computing machines, such as modules described herein or any other modules (scripts, web content, software, firmware, or hardware) associated with the technology presented herein may by any of the modules discussed in more detail with respect to FIG. 15. The computing machines discussed herein may communicate with one another as well as other computer machines or communication systems over one or more networks, such as network 120. The network 120 may include any type of data or communications network, including any of the network technology discussed with respect to FIG. 15.

Example Processes

The example methods illustrated in FIGS. 2-14 are described hereinafter with respect to the components of the example operating environment 100. The example methods of FIGS. 2-7 may also be performed with other systems and in other environments.

Figure 2:
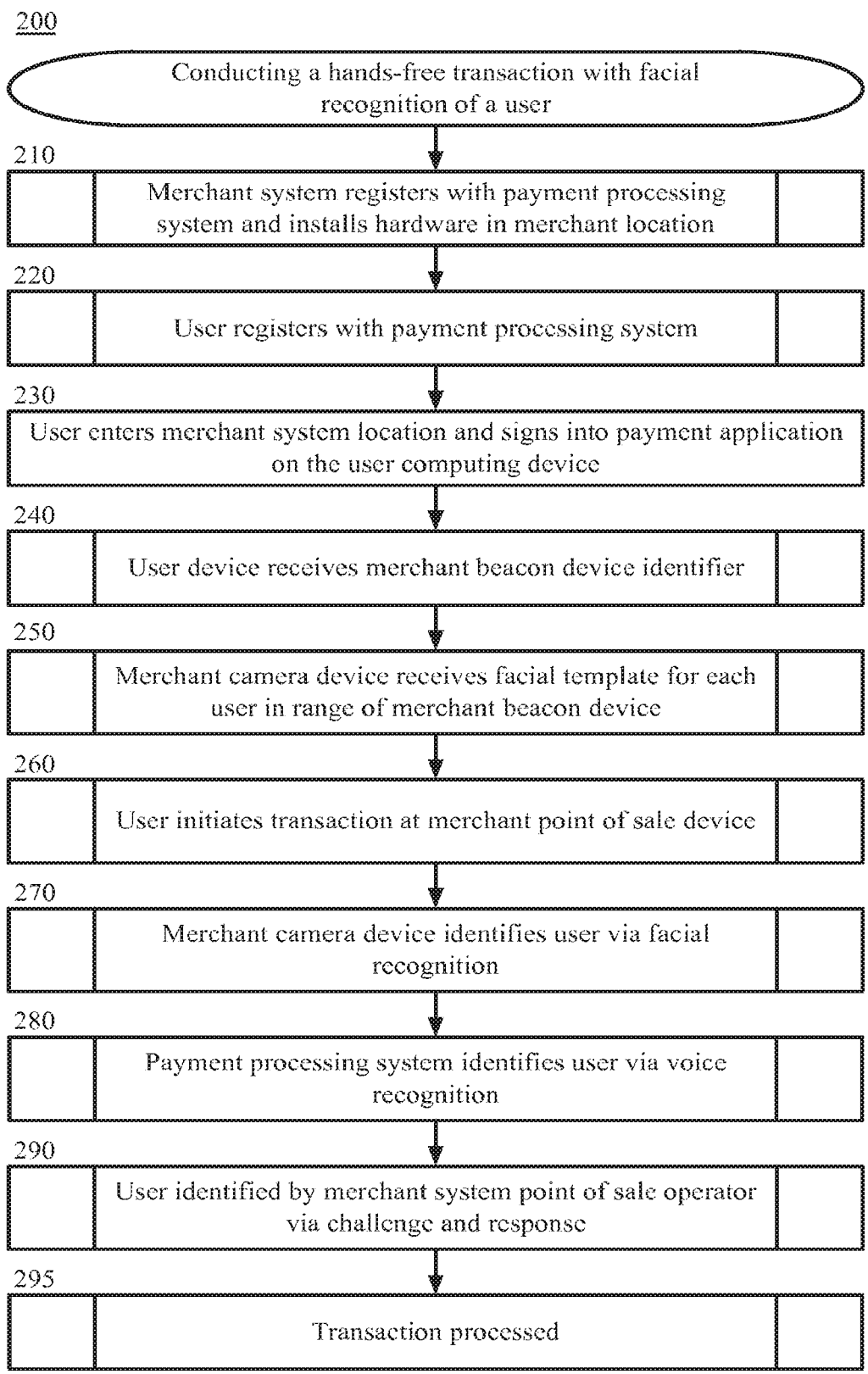
FIG. 2 is a block flow diagram depicting a method for conducting a hands-free transaction with facial recognition of a user, in accordance with certain example embodiments.

FIG. 2 is a block diagram depicting a method 200 for conducting a hands-free transaction with facial recognition of a user 101, in accordance with certain example embodiments. The method 200 is described with reference to the components illustrated in FIG. 1.

In block 210, the merchant system registers with the payment processing system 160 and installs hardware in a merchant location. The method for registering, by a merchant system, with a payment processing system 160 and installing hardware at a merchant system location is described in more detail hereinafter with reference to the method described in FIG. 3.

Figure 3:
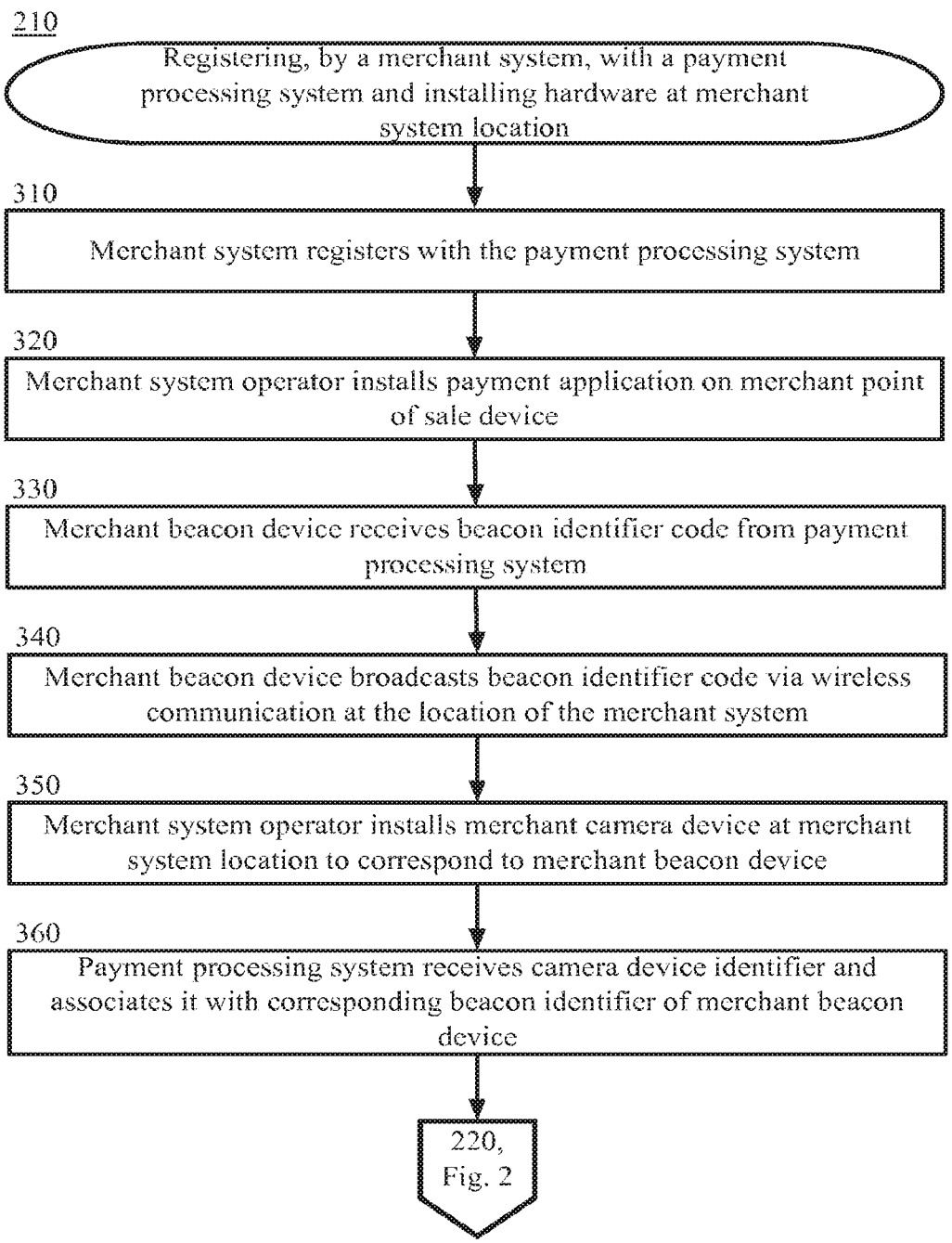
FIG. 3 is a block flow diagram depicting a method for registering, by a merchant system, with a payment processing system and installing hardware at merchant system location, in accordance with certain example embodiments.

FIG. 3 is a block diagram depicting a method 210 for registering, by a merchant system, with a payment processing system 160 and installing hardware at a merchant system location, in accordance with certain example embodiments. The method 210 is described with reference to the components illustrated in FIG. 1.

In the example embodiments described herein, the merchant system does not need to install hardware at the example merchant system location in any particular order. The method 210 describes one example method of installing hardware at the merchant location. However, the merchant system or other system installing the merchant hardware does not need to install the merchant POS device 130, the merchant camera device 140, or the merchant beacon device 120 in the order described herein.

In block 310, a merchant system registers with the payment processing system 160. In an example embodiment, an agent of the merchant system accesses a payment processing system 160 website and registers for a merchant account with the payment processing system 160 via the website. In an example embodiment, the merchant system adds payment account information associated with a merchant account to the merchant account managed by the payment processing system 160. In an example embodiment, the merchant system comprises one or more merchant system locations. For example, the merchant system may comprise one or more physical store locations. An example merchant location comprises one or more merchant point of sale ("POS") devices 130. In an example embodiment, one or more merchant POS device operators 102 operate the one or more merchant POS devices 130 at the merchant system location.

In block 320, a merchant system operator installs the payment application 133 on the merchant point of sale device 130. In another example embodiment, the merchant system operator purchases a merchant POS device 130 from the payment processing system 160 with the payment application 133 pre-installed on the merchant POS device 130. In an example embodiment, the merchant POS device 130 is able to communicate with the payment processing system 160 over a network 120. In an example embodiment, the merchant POS device 130 communicates with the payment processing system 160 via the payment application 133. For example, the merchant POS device 130 may be able to transmit transaction details to the payment processing system 160 via the payment application 133 over the network 120 to enable the payment processing system 160 to process a transaction. In another example, the merchant POS device 130 may be able to receive a receipt from the payment processing system 160 that notifies a merchant POS device operator 102 as to whether a transaction was successful or not.

In block 330, the merchant beacon device 120 receives a beacon identifier code from the payment processing system 160. In an example embodiment, the merchant system receives a beacon identifier from the payment processing system 160 and installs or otherwise saves the beacon identifier on the merchant beacon device 120. In an example embodiment, a merchant system operator installs the merchant beacon device 120 in proximity to a merchant POS device 130. In an example embodiment, the merchant system operator installs a plurality of merchant beacon devices 120, each merchant beacon device 120 in proximity to one or more associated merchant POS devices 130. In an example embodiment, the merchant beacon device 120 is able to broadcast a merchant beacon identifier over a wireless medium, wherein one or more user computing devices 110 located within a threshold proximity to the merchant beacon device 120 are able to receive the merchant beacon identifier over the wireless medium. In another example embodiment, the merchant beacon device 120 is able to establish a local network 120 connection to one or more user computing devices 110 located within a threshold proximity to the merchant beacon device 120 and the merchant beacon device 120 transmits the merchant beacon identifier to the one or more user computing devices 110 over the established local network 120 connection. For example, the threshold proximity depends on the network 120 communication protocol utilized by the merchant beacon device 120.

In block 340, the merchant beacon device 120 broadcasts the beacon identifier code via wireless communication at the location of the merchant system. For example, the merchant beacon device 120 may broadcast, emit, or otherwise transmit data comprising the beacon identifier via Wi-Fi, Bluetooth, Bluetooth low energy ("BLE"), near field communication ("NFC"), or other appropriate communication protocol to one or more user computing devices 110 located at the merchant system location within a threshold proximity to the merchant beacon device 120. In some example embodiments, the merchant beacon device 120, at a time before transmitting the merchant beacon identifier, is operable to establish a network 120 connection between the merchant beacon device 120 and one or more user computing devices 110 located at the merchant system location within a threshold proximity to the merchant beacon device 120.

In block 350, a merchant system operator installs the merchant camera device 140 at the merchant system location to correspond to the merchant beacon device 120. In an example embodiment, both a merchant camera device 140 and a merchant beacon device 120 are installed in proximity to a particular merchant POS device 130. In another example embodiment, a merchant camera device 140 and a merchant beacon device 120 are installed in proximity to two or more particular merchant POS devices 130. In an example embodiment, the merchant camera device 140 is oriented to be able to capture video and/or images of a face of a user 101 standing in front of one or more merchant POS devices 130 during the process of checkout. In an example embodiment, the merchant system installs a merchant camera device 140 that is oriented to capture video and/or images of the face of a user standing in front of a particular merchant POS device 130. In another example embodiment, the merchant system installs a merchant camera device 140 that is oriented to capture video and/or images of the faces of one or more users 101 standing within a proximity of a particular plurality of merchant POS devices 130 within a range of a field of vision of the camera module 147 of the merchant camera device 140.

In block 360, the payment processing system 160 receives a merchant camera device 140 identifier and associates it with the corresponding beacon identifier code of the merchant beacon device 120. In an example embodiment, the merchant system and/or the payment processing system 160 configures the merchant camera device 140 so that the merchant camera device 140 is able to communicate with the payment processing system 160 over the network 120. An example camera device 140 identifier comprises a hardware identifier, a MAC address, or other useful or relevant identifier associated with the merchant camera device 140. In an example embodiment, the payment processing system 160 comprises a database comprising merchant camera device 140 identifiers and associated beacon identifiers for merchant beacon device 120 identifiers for a particular merchant system location. In an example embodiment, the merchant camera device transmits the merchant beacon device 120 identifier in addition to the merchant camera device 140 identifier to the payment processing system 160. In an example embodiment, the merchant camera device 140, during the setup and installation process, may receive the merchant beacon device 120 identifier over an appropriate wireless communication channel from the merchant beacon device 120. In another example embodiment, the merchant camera device 140, during the setup and installation process, may establish a network 120 connection with the merchant beacon device 120 and receive the merchant beacon device 120 identifier over the network 120. In another example embodiment, the payment processing system 160 receives the merchant camera device 140 identifier, extracts one or more merchant beacon device 120 identifiers from the database, and associates the merchant camera device 140 identifier with one or more of the one or more extracted merchant beacon device 120 identifiers. In yet another example embodiment, the merchant system operator installs the one or more merchant beacon devices 120 after installing the one or more merchant camera devices 140. In this example embodiment, the payment processing system 160 generates a merchant beacon device identifier to associate with a merchant camera device 140 identifier and transmits the generated merchant beacon device identifier to the merchant system. In this example embodiment, the merchant system operator manually configures the merchant beacon device 120 to broadcast, emit, or otherwise transmit the merchant beacon device identifier assigned by the payment processing system 160 over a network 120.

In certain example embodiments, one or both of the merchant camera device 140 and the merchant beacon device 120 are components of the merchant POS device 130 or are wirelessly or physically connected to the merchant POS device 130 and controlled by one or more processors of the merchant POS device 130. In certain example embodiments, certain functions described herein as performed by the merchant camera device 140 and/or the merchant beacon device 120 may also be performed by the merchant POS device 130.

From block 360, the method 210 proceeds to block 220 of FIG. 2.

Returning to FIG. 2, in block 220, the user 101 registers with the payment processing system 160. The method for registering, by a user 101, for an account with a payment processing system 160 is described in more detail hereinafter with reference to the method 220 described in FIG. 4.

Figure 4:
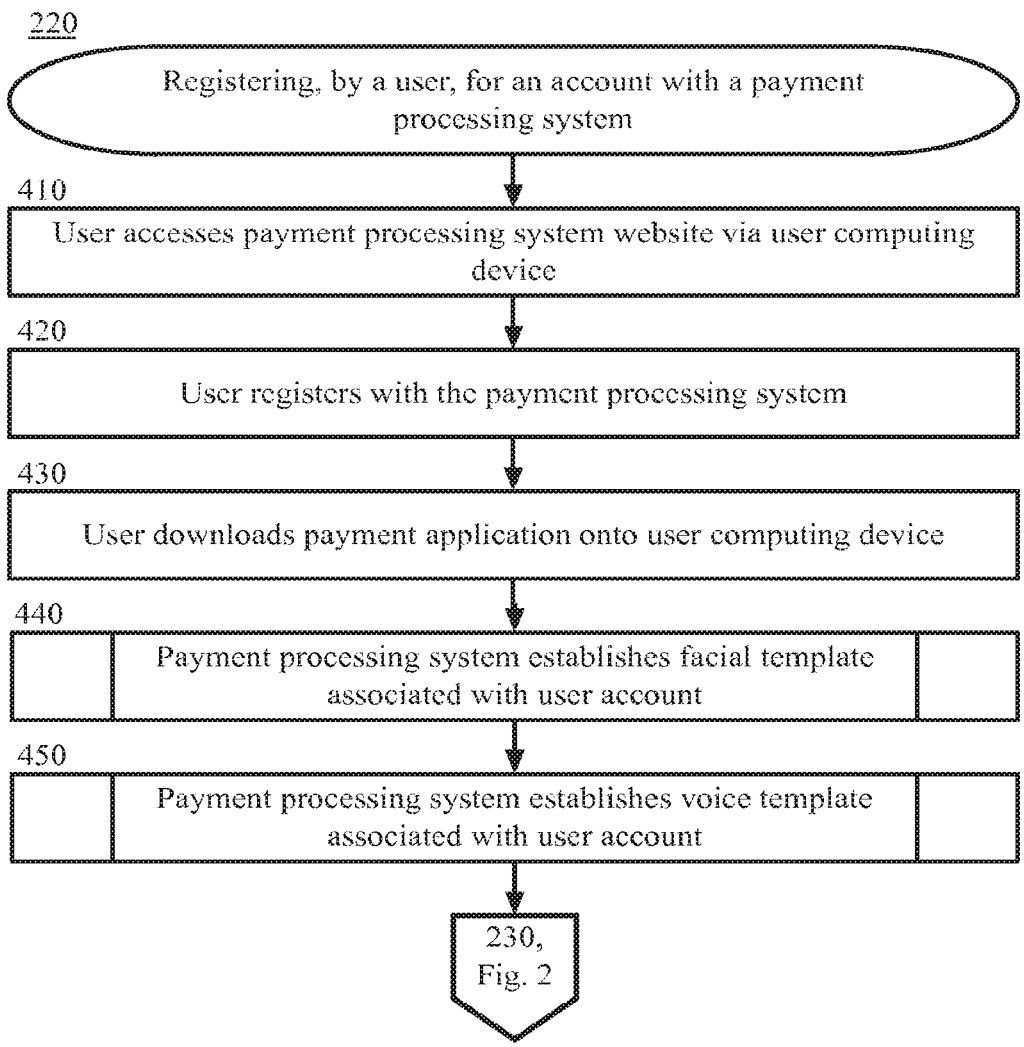
FIG. 4 is a block flow diagram depicting a method for registering, by a user, for an account with a payment processing system, in accordance with certain example embodiments.

FIG. 4 is a block diagram depicting a method 220 for registering, by a user 101, for an account with a payment processing system 160, in accordance with certain example embodiments. The method 220 is described with reference to the components illustrated in FIG. 1.

In block 410, the user 101 accesses the payment processing system website 169. For example, the user 101 accesses the payment processing system 160 via the web browser 118 of the user computing device 110. In another example, the user 101 may otherwise contact the payment processing system 160 to register for a user 101 account.

In block 420, the user 101 registers with the payment processing system 160. The user 101 may obtain a user account number, receive the appropriate applications and software to install on the user computing device 110, request authorization to participate in hands-free payment processing, or perform any action required by the payment processing system 160. The user 101 may utilize the functions of the user computing device 110, such as the user interface 115 and the web browser 118, to register and configure a user 101 account. In an example embodiment, the user 101 may enter payment account information associated with one or more user 101 accounts, for example, one or more credit accounts, one or more bank accounts, one or more stored value accounts, and/or other appropriate accounts into the user 101 account maintained by the payment processing system 160.

In block 430, the user 101 downloads the payment application 113 onto the user computing device 110. In an example embodiment, the payment application 113 operating on the user computing device 110 is able to communicate with the payment processing system 160 over the network 120. In an example embodiment, the user 101 may configure user 101 account settings or add, delete, or edit payment account information via the payment application 113. In an example embodiment, the user 101 may select an option to enable or disable the permission of the payment processing system 160 to process hands free transactions. For example, a hands free transaction comprises a transaction wherein the user 101 does not need to interact with the user computing device 110 or requires minimal user 101 interaction with the user computing device 110 to initiate a transaction with the merchant system.

In block 440, the payment processing system 160 establishes a facial template associated with the user 101 account. The method for establishing a facial template associated with a user 101 account is described in more detail hereinafter with reference to the method 440 described in FIG. 5.

Figure 5:
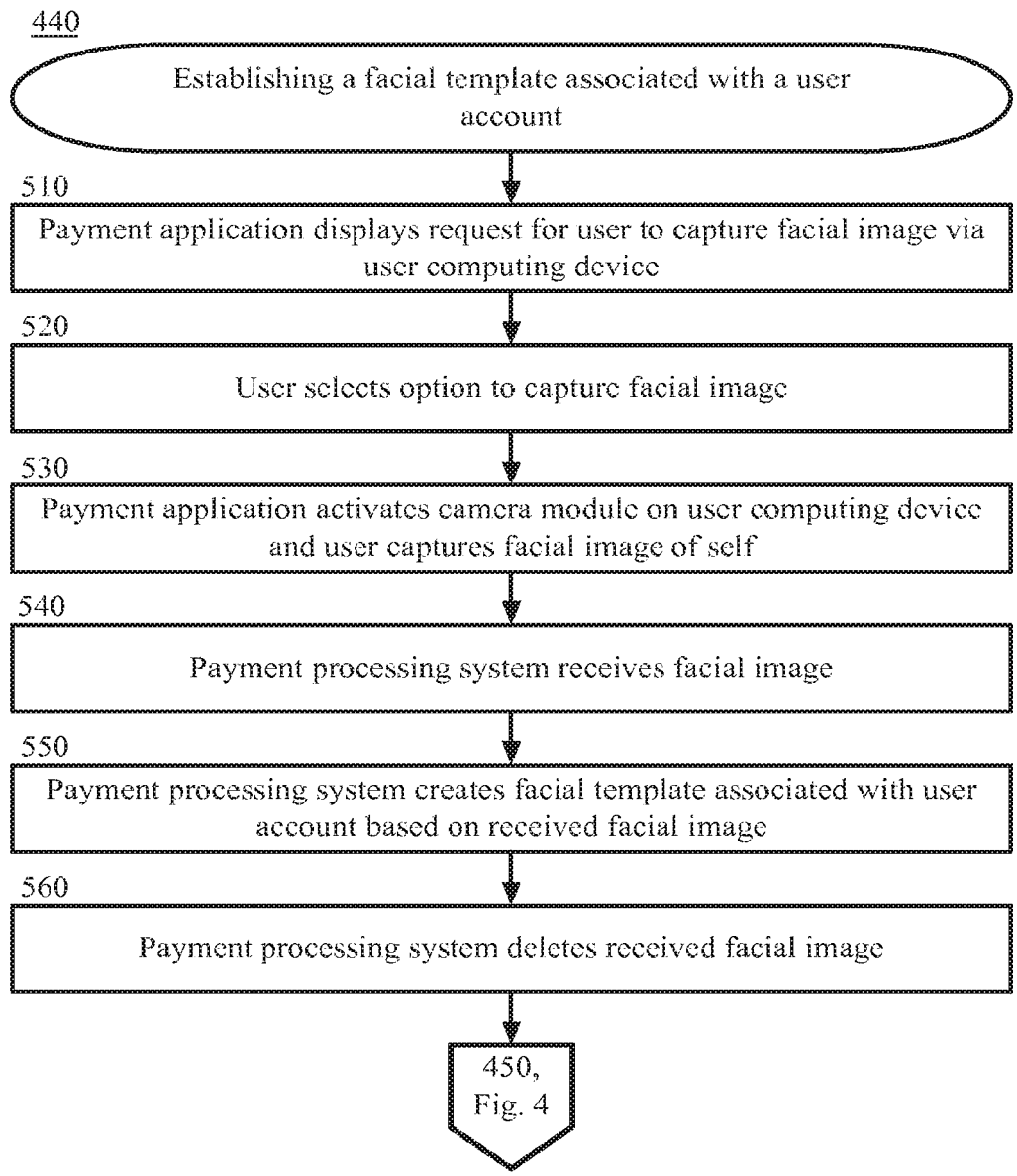
FIG. 5 is a block flow diagram depicting a method for establishing a facial template associated with a user account, in accordance with certain example embodiments.

FIG. 5 is a block diagram depicting a method 440 for establishing a facial template associated with a user 101 account, in accordance with certain example embodiments. The method 440 is described with reference to the components illustrated in FIG. 1.

In block 510, the payment application 113 displays a request for the user 101 to capture a facial image via the user computing device 110. In an example embodiment, the payment application 113 displays the request via the user interface 115. In an example, the user interface 115 may display a request that reads, "to enable hands free transactions, we need an image of your face. Would you like submit a facial image now?" In this example, the user 101 may select an option to take a current picture or may otherwise select a picture stored on the user computing device 110.

In block 520, the user 101 selects an option to capture a facial image. For example, the user 101 actuates an object on the user interface 115 that reads, "yes, I would like to take a picture now."

In block 530, the payment application 113 activates the camera module 117 on the user computing device 110 and the user 101 captures a facial image of himself. In an example embodiment, the user computing device user interface 115 may display a live camera feed of the user 101 to aid the user 101 in aligning the user's 101 face to take the facial image. In an example embodiment, the payment application 113 may display on the user computing device 110 a box or other perimeter on the user interface 115 within which the user 101 should align his face to take a picture of a required size predetermined by the payment processing system 160. In an example embodiment, the user 101 may actuate an object on the user interface 115 to capture the image. In this example embodiment, in response to the user actuating the object on the user interface 115, the camera module 117 receives a command from the payment application 113 to capture an image of the user 101. In another example embodiment, the camera module 117 receives a command from the payment application 113 to capture a plurality of images of the user 101 as the user 101 moves the camera around the user's 101 face. For example, each of the plurality of images of the user 101 may correspond to a particular pose of the user's 101 face. An example facial image may comprise a digital image of the face of a user 101. In an example embodiment, the payment processing system 160 may establish guidelines for users 101 in submitting facial images. For example, the payment application 113 may direct the user 101 to remove any hats, head coverings, glasses, or other objects or accessories that may occlude regions of the user's 101 face so that payment application 160 may receive a complete depiction of the user's 101 face.

In an example embodiment, the user computing device 110 determines if the captured facial image is a valid facial image or an invalid facial image. For example, a valid facial image complies with guidelines predetermined by the payment processing system 160 and an invalid facial image does not comply with one or more of the guidelines. For example, if the user computing device 110 captures a facial image that comprises incorrect dimensions, if part or all of the user's 101 face is occluded, or if the image is too dark or too bright, the user computing device 110 rejects the invalid facial image and displays a request directing the user 101 to capture a subsequent facial image. In this example, the user 101 captures a subsequent facial image via the user computing device 110, and the user computing device 110 transmits the subsequent facial image to the payment processing system 160 via the network 120.

In block 540, the payment processing system 160 receives the facial image. In another example embodiment, the payment processing system 160 receives a plurality of facial images of the user 101. For example, the payment application 113 transmits the one or more facial images of the user 101 to the payment processing system 160 via the network 120. In an example embodiment, the payment processing system 160 associates the received one or more facial images with the user 101 account. For example, the payment processing system 160 is able to identify the user 101 account to associate with the received one or more images because the user 101 is currently logged in to the payment application 113 on the user computing device 110 at the time the one or more facial images are transmitted to the payment processing system 160. In certain example embodiments, the payment processing system 160 determines if the received facial image is a valid facial image or an invalid facial image. For example, a valid facial image complies with all guidelines predetermined by the payment processing system 160 and an invalid facial image does not comply with one or more of the guidelines. For example, if a user 101 submits a facial image that comprises incorrect dimensions, if part or all of the user's 101 face is occluded, or if the image is too dark or too bright, the payment processing system 160 rejects the invalid facial image and transmits a request to the user computing device 110 directing the user 101 to capture a subsequent facial image to transmit to the payment processing system 160. In this example, the user computing device 110 receives and displays the request, the user 101 captures a subsequent facial image via the user computing device 110, and the user computing device 110 transmits the subsequent facial image to the payment processing system 160 via the network 120.

In block 550, the payment processing system 160 creates a facial template associated with the user 101 account based on the received facial image. In another example embodiment, the payment processing system 160 generates a corresponding facial template for each of a plurality of received facial images associated with the user 101 account. In an example, the facial template is of a predetermined size, for example, a 128-byte facial template. In an example, the payment processing system 160 generates a facial template comprising a computer code representation of the digital facial image. For example, the facial template may describe key features of the facial image of the user 101, such as shape, color, line, value, space, form, texture, or other useful or relevant feature of the image or of particular regions of the image. In an example, the facial template is generated by processing the facial image through a convolutional neural network. In an example embodiment, the payment processing system 160 stores the generated facial template associated with the user 101 in a data storage unit 166 associated with the payment processing system 160. For example, the payment processing system 160 database may comprise a table or other means by which it correlates each user 101 account identifier with an associated facial template of the user 101.

In another example embodiment, after the user computing device 110 captures one or more facial images of the user 101, the user computing device 110 generates one or more facial templates corresponding to one or more of the one or more captured facial images of the user 101. In this example embodiment, the user computing device 110 transmits the one or more generated facial templates to the payment processing system 160 over the network 120.

In block 560, the payment processing system 160 deletes the received facial image. For example, the payment processing system 160 only uses a facial template comprising a computer code representation of the facial image of the user 101. In another example, the payment processing system 160 saves the received facial image for future processing. For example, the payment processing system 160, at a later time, updates a facial template generation algorithm and generates an updated facial template corresponding to the saved facial image.

From block 560, the method 440 proceeds to block 450 in FIG. 4.

Returning to block 450, in FIG. 4, the payment processing system 160 establishes a audio template associated with the user 101 account. The method for establishing an audio template associated with a user 101 account is described in more detail hereinafter with reference to the method 450 described in FIG. 6.

Figure 6:
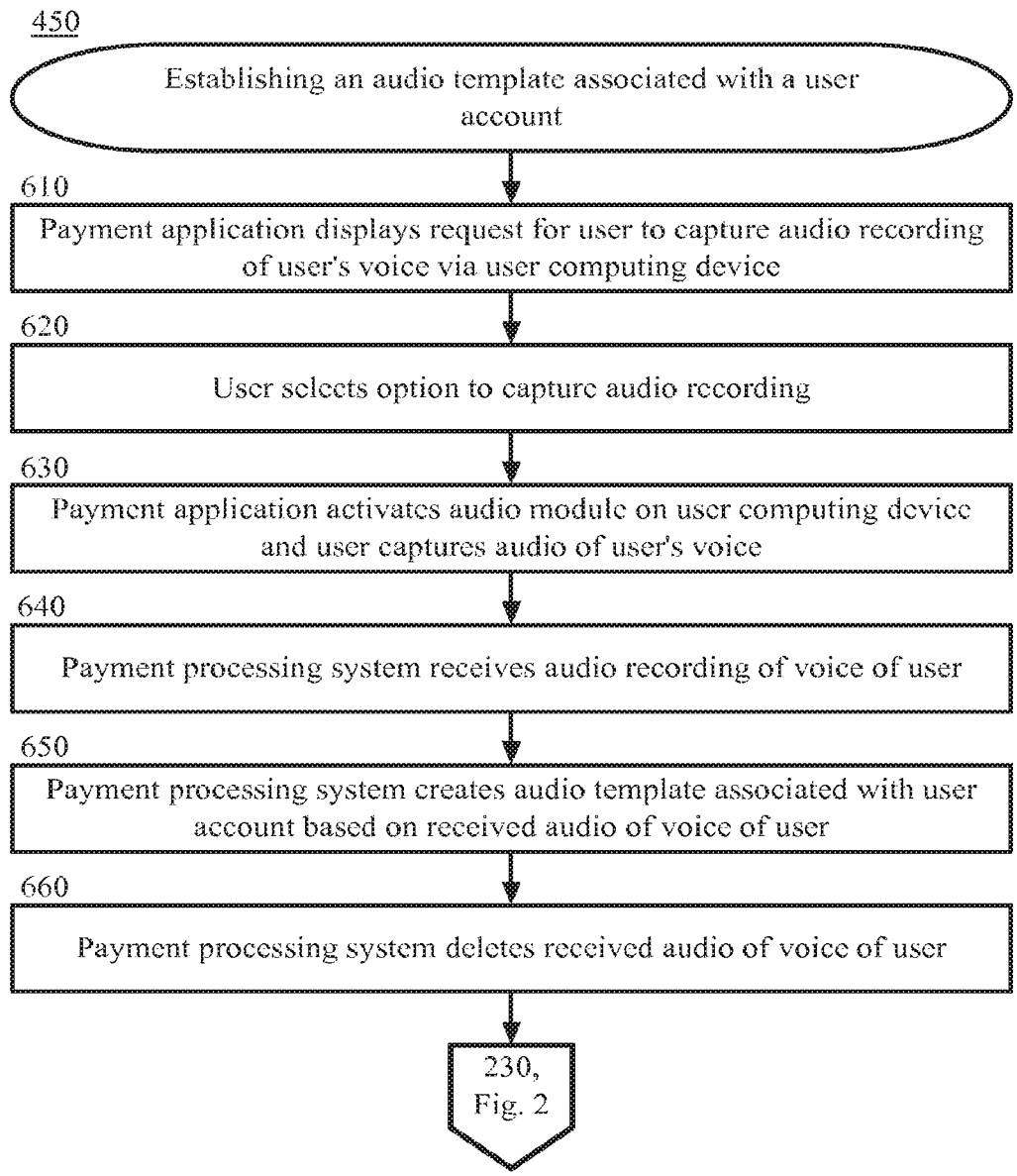
FIG. 6 is a block flow diagram depicting a method for establishing an audio template associated with a user account, in accordance with certain example embodiments.

FIG. 6 is a block diagram depicting a method 450 for establishing an audio template associated with a user 101 account, in accordance with certain example embodiments. The method 450 is described with reference to the components illustrated in FIG. 1.

In block 610, the payment application 113 displays a request for the user 101 to capture an audio recording of the user's 101 voice via the user computing device 110. In an example embodiment, the payment application 113 displays the request via the user interface 115. In an example, the user interface 115 may display a request that reads, "to enable hands free transactions, we need recording of your voice. Would you like submit a audio recording now?" In this example, the user 101 may select an option to submit a live audio recording or may otherwise select a pre-recorded audio recording of the user 101 stored on the user computing device 110.

In block 620, the user 101 selects an option to capture an audio recording. For example, the user 101 actuates an object on the user interface 115 that reads, "yes, I would like to submit a audio recording now."

In block 630, the payment application 113 activates an audio module (not depicted) on the user computing device 110 and the user 101 captures an audio of the user's 101 voice. In an example embodiment, the user computing device user interface 115 may display guidelines received from the payment processing system 160 to aid the user 101 in submitting a audio recording. For example, the payment application 113 may display directions for the user 101 to record the user's 101 voice saying the user's 101 name. In another example, the payment application 113 directs the user 101 to capture a audio recording to establish a voice password that can be used in hands-free transactions of the user 101. In an example embodiment, the user 101 may actuate an object on the user interface 115 to capture or record a live audio recording. In this example embodiment, in response to the user actuating the object on the user interface 115, the audio module receives a command from the payment application 113 to capture a audio recording of the user 101. In an example embodiment, the payment processing system 160 may establish guidelines for users 101 in submitting audio recordings. For example, the payment application 113 may direct the user 101 to submit a audio recording no longer than a predefined maximum length of duration. For example, the audio recording must be no longer than five seconds. In another example, the payment application 113 may direct the user 101 submit a audio recording lasting a predefined length of time, for example, a audio recording lasting five seconds. In an example embodiment, after the user 101 initiates a audio recording by actuating an object of the user interface 115, the payment application 113 transmits a command to the audio module to stop recording the user's 101 voice after the predefined length of time or predefined maximum length of time has expired.

In block 640, the payment processing system 160 receives an audio recording of the voice of the user 101. For example, the payment application 113 or audio module transmits the audio recording to the payment processing system 160 over the network 120. In another example, the payment application 113 retrieves an audio recording selected by the user 101 and saved in the data storage unit 116 and transmits the retrieved audio recording to the payment processing system 160 over the network 120.

In block 650, the payment processing system 160 creates an audio template associated with the user's 101 voice based on the received audio of the voice of the user. In an example, the audio template is of a predetermined size. In an example, the payment processing system 160 generates a audio template comprising a computer code representation of the user's 101 audio recording. For example, the audio template may describe key features of the audio recording of the user 101, such as the intonation of the user's 101 voice or other features of the user's 101 voice. [Inventors: does this work similarly to the face template?] In an example embodiment, the payment processing system 160 stores the generated audio template associated with the user 101 in a data storage unit 166 associated with the payment processing system 160. For example, the payment processing system 160 database may comprise a table or other means by which it correlates each user 101 account identifier with an associated audio template of the user 101

In block 660, the payment processing system 160 deletes the received audio of the voice of the user 101. In an example embodiment, the payment processing system 160 deletes the received audio recording of the user 101 to protect the privacy of the user 101. For example, the payment processing system 160 only uses a audio template comprising a computer code representation of the audio recording of the user 101.

From block 660, the method 440 proceeds to block 230 in FIG. 2.

Returning to block 230, in FIG. 2, the user 101 enters the merchant system location and signs into the payment application 113 on the user computing device 110. In another example embodiment the user 101 signs into the payment application 113 at a time before entering the merchant system location and enters the merchant location carrying the user computing device 110 signed into the payment application 113.

In block 240, the user device receives a merchant beacon device 120 identifier. The method for receiving, by a user computing device 110, a merchant beacon identifier broadcast by a merchant beacon device 120 is described in more detail hereinafter with reference to the method 240 described in FIG. 7.

Figure 7:
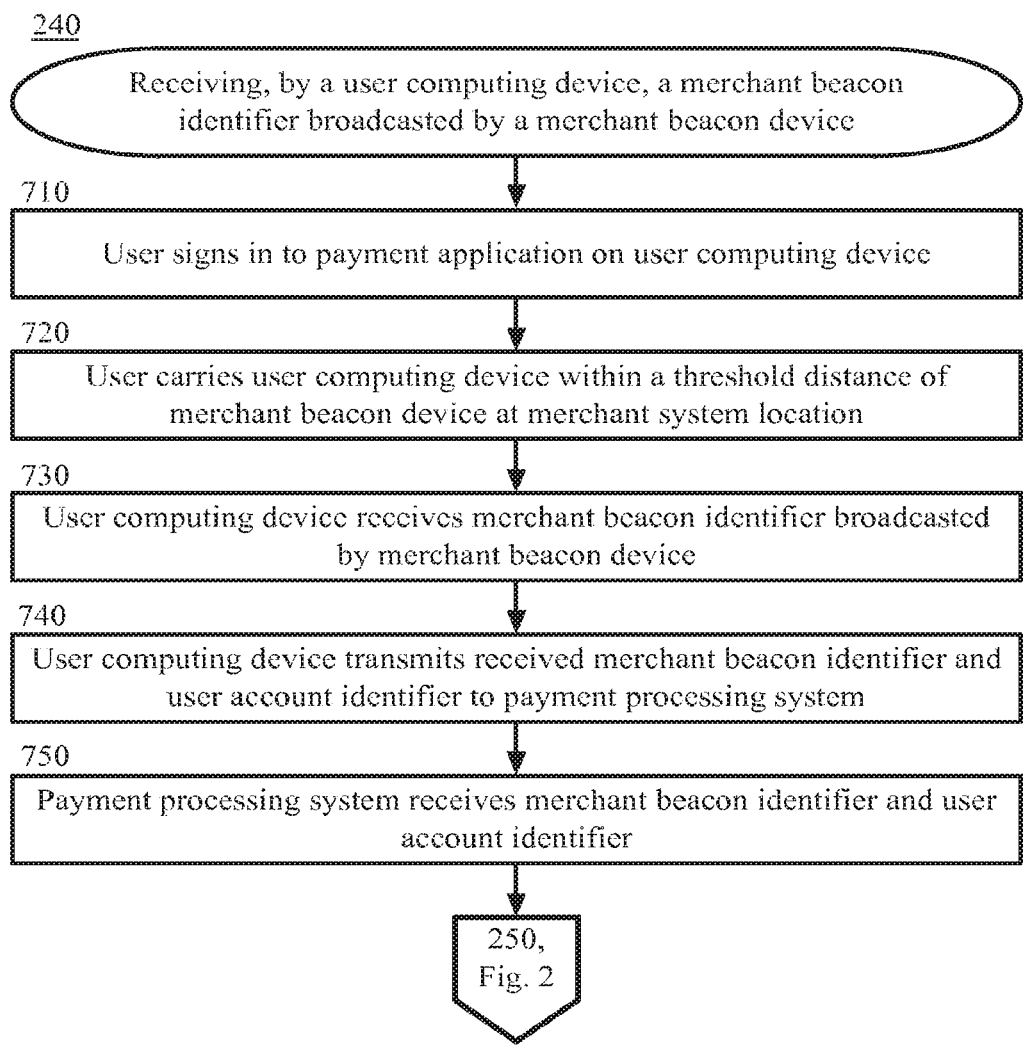
FIG. 7 is a block flow diagram depicting a method for receiving, by a user computing device, a merchant beacon identifier broadcast by a merchant beacon device, in accordance with certain example embodiments.

FIG. 7 is a block diagram depicting a method 240 for receiving, by a user computing device 110, a merchant beacon identifier broadcast by a merchant beacon device 120, in accordance with certain example embodiments. The method 240 is described with reference to the components illustrated in FIG. 1.

In block 710, the user 101 signs in to the payment application 113 on the user computing device 110. In an example embodiment, the user 101 may have a username and password associated with the user 101 account maintained by the payment processing system 160. In an example embodiment, the user 101 opens the payment application 113 on the user computing device 110 and enters a username and/or password via the user interface 115 to sign in to the payment application 113. In an example embodiment, when the user 101 is signed in to the payment application 113, the payment application is able to communicate with the payment processing system 160 over the network 120. In this example embodiment, when the user 101 is not signed in to the payment application 113, the payment application does not communicate with the payment processing system 160 even if the a network 120 connection is available. In an example embodiment, the user 101 may sign out of the payment application 113 at any time by actuating one or more objects on the user interface 115 of the user computing device 110. In an example embodiment, after signing in to the payment application 113, the user 101 configure one or more user 101 account settings, add, edit, or delete user 101 payment account information, and/or change user 101 preferences. In certain example embodiments, a user 101 may be required to make a feature selection to obtain the benefits of the techniques described herein. For example, the user 101 may have to enable one or more user 101 account settings to enable hands free transactions according to the methods described herein.

In an example embodiment, payment application 113 may provide options, data, configurable alerts, and other suitable features to the user 101. For example, the payment application 113 may comprise a listing of merchant systems and merchant locations that participate in hands free payment transactions according to one or more of the methods described herein. The listing may be updated periodically from the payment processing system 160. The payment application 113 may notify the user 101 when the user 101 is within a configured vicinity of a participating merchant system. The payment application 113 may provide the user 101 with options to update payment preferences. The payment application 113 may provide the user 101 with a listing of recent transactions. The payment application 113 may provide any other suitable information to the user 101.

In block 720, the user 101 carries the user computing device 110 within a threshold distance of the merchant beacon device 120 at the merchant system location. In an example embodiment, the user 101 enters a location of the merchant system. The user 101 may enter the merchant location carrying the user computing device 110 in a pocket or a bag, in the hands of the user 101, or in any suitable manner. The location of the merchant system may be a store location, a kiosk location, or any suitable physical location of a merchant system. In another example embodiment, a merchant POS operator 102 may be mobile and arrive at a location of the user 101. For example, the merchant system may be a restaurant and the merchant POS device operator 102 may be a delivery person possessing a portable merchant POS device 130.

In certain example embodiments, the payment application 113 may alert the user 101 when the user 101 is in the vicinity of a merchant system that accepts hands-free payments. The alert may be provided via a message on the user computing device 110, via an email or a text, or in any suitable manner. In an example embodiment, the alert may be based on the location of the user 101 as determined by a GPS module (not depicted) resident on the user computing device 110. For example, the payment application 113 accesses the GPS data from the GPS module and compare the GPS location to a list of locations of merchant systems that accept hands free payments. For example, the payment application 113 comprises a list or accesses a list maintained by the payment processing system 160 of merchant system locations that accept hands free payments. If a match results from the comparison, then an alert is generated and provided to the user 101. The match may result if the user 101 is within a configured distance of a qualified merchant system location. In an example embodiment, the alerts may be configured to alert in any suitable manner. In an example, the alerts may be combined in commercially dense environments or the alerts may be presented individually. In another example, the alerts may be configured to only alert the user 101 a configured number of times. For example, the alert may be presented three times, but upon a fourth instance, the alert is not presented. The alerts may be presented as a notification with an audible alert, a vibration, a popup alert on the user interface 115 of the user computing device 110, or other suitable alert.

In block 730, the user computing device 110 receives a merchant beacon identifier broadcast by the merchant beacon device 120. The user computing device 110 recognizes a merchant beacon device 120 via wireless communication at the location of the merchant system. The user computing device 110 may be configured to search for beacons or other wireless signals. In an example embodiment, the user computing device 110 and the merchant beacon device 120 establish a Wi-Fi wireless network 120 connection. In other example embodiments, the user computing device 110 and the merchant beacon device 120 establish a Bluetooth, BLE, NFC, or other appropriate network 120 connection. Upon entering the range of the signal of the merchant beacon device 120, the user computing device 110 receives the merchant beacon identifier.

In block 740, the user computing device 110 transmits the received merchant beacon identifier and a user 101 account identifier to the payment processing system 160. In an example embodiment, the user computing device 110 transmits the data received in the merchant beacon identifier along with a user 101 account identifier to the payment processing system 160 over the network 120.

In block 750, the payment processing system 160 receives the merchant beacon identifier and the user 101 account identifier. For example, the payment processing system 160 receives the merchant beacon identifier and the user 101 account identifier over the network 120. The user computing device 110 may compare the data from the merchant beacon identifier to a database of merchant beacon identifier data and merchant camera device identifier data to determine an identity of the merchant system and merchant camera device 140 associated with the merchant beacon identifier and/or to verify the authenticity of the beacon.

From block 750, the method 240 proceeds to block 250 in FIG. 2.

Returning to FIG. 2, in block 250, the merchant camera device 140 receives a facial template for each user 101 in range of the merchant beacon device 120. The method for receiving, by a merchant camera device 140, a facial template for each user 101 in range of the merchant beacon device 120 is described in more detail hereinafter with reference to the method 250 described in FIG. 8.

Figure 8:
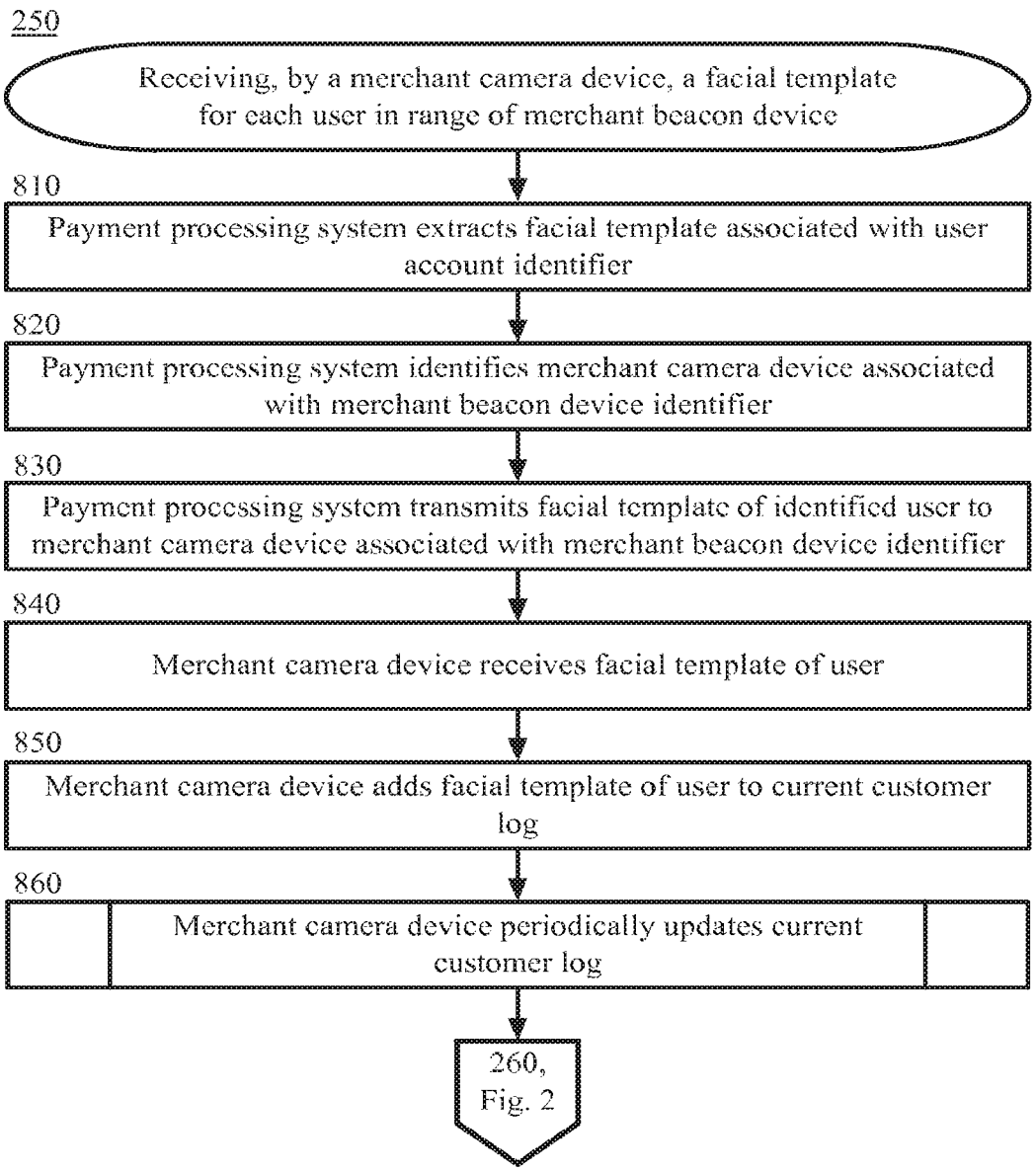
FIG. 8 is a block flow diagram depicting a method for receiving, by a camera device, a facial template for each user in range of a merchant beacon device, in accordance with certain example embodiments.

FIG. 8 is a block diagram depicting a method 250 for receiving, by a merchant camera device 140, a facial template for each user 101 in range of the merchant beacon device 120, in accordance with certain example embodiments. The method 250 is described with reference to the components illustrated in FIG. 1.

In block 810, the payment processing system 160 extracts a facial template associated with the user 101 account identifier. In an example embodiment, the payment processing system 160 accesses a database comprising stored facial templates of a plurality of users 101 with corresponding user 101 account identifiers for each user 101. For example, this database is stored in the data storage unit 166.

In block 820, the payment processing system 160 identifies a merchant camera device 120 associated with the merchant beacon device 120 identifier. In an example embodiment, the payment processing system 160 recognizes that the merchant beacon identifier is associated with the payment processing system 160 and a particular merchant camera device 140 at the merchant system location. In an example embodiment, the payment processing system 160 recognizes that the merchant beacon identifier is associated with a plurality of merchant camera devices 140 installed at a particular merchant location.

In block 830, the payment processing system 160 transmits the facial template of the identified user 101 to the merchant camera device 140 associated with the merchant beacon device 120 identifier. In another example embodiment, the payment processing system 160 transmits the facial template of the identified user 101 to a plurality of merchant camera devices 140 associated with the merchant beacon device 120 identifier. In certain example embodiments, the payment processing system 160 receives, in real time, a plurality of transmissions from user computing devices 101 corresponding to a plurality of users 101 present at the merchant system location, each transmission comprising a user 101 account identifier and a retransmitted merchant beacon identifier. In these example embodiments, the payment processing system 160 retrieves, in response to receiving each such transmission, a facial template associated with the received user 101 account identifier and transmits a facial template to one or more merchant camera devices 140 at the merchant location associated with the merchant beacon identifier.

In block 840, the merchant camera device 140 receives the facial template of the user 101. In another example embodiment, a plurality of merchant camera devices 140 receive the facial template of the user 101. In yet another example embodiment, the merchant camera device 140 and/or the plurality of merchant camera devices 140 receive one or more additional facial templates from the payment processing system 160 corresponding to one or more users 101 other than the instant user 101 having user computing devices 110 in network 120 connection to a merchant beacon device according to the method previously described herein. For example, the one or more additional facial templates are received in real time from the payment processing system 160 as additional users 101 other than the instant user 101 receive the merchant beacon device 120 identifier over a wireless communication network 120 or otherwise establish a network 120 connection between their user computing devices 110 and one or more merchant beacon devices 120. For example, the one or more merchant camera devices 140 may receive one or more additional facial templates corresponding to one or more additional users 101 at a time before, at the same time, or after the time at which the merchant camera device 140 receives the facial template of the instant user 101.

In block 850, the merchant camera device 140 adds the facial template of the user 101 to a current customer log. In an example embodiment, the current customer log is accessible by the merchant camera device 140 and by the payment processing system 160. In another example embodiment, the current customer log is additionally accessible by the merchant POS device 130 and/or an applicable computing device of the merchant system. In an example embodiment, the payment processing system 160 comprises and maintains the current customer log, which the merchant camera device 140 may access via the network 120. In another example embodiment, the merchant camera device 140 comprises and maintains the current customer log, which is accessible to the payment processing system 160 by communicating with the user computing device 110 via the network 120.

In block 860, the merchant camera device 140 periodically updates the current customer log. The method for receiving, by a merchant camera device 140, notification from a payment processing system 160 as users 101 enter or leave a network range of a merchant beacon device 120 is described in more detail hereinafter with reference to the method 860 described in FIG. 9.

Figure 9:
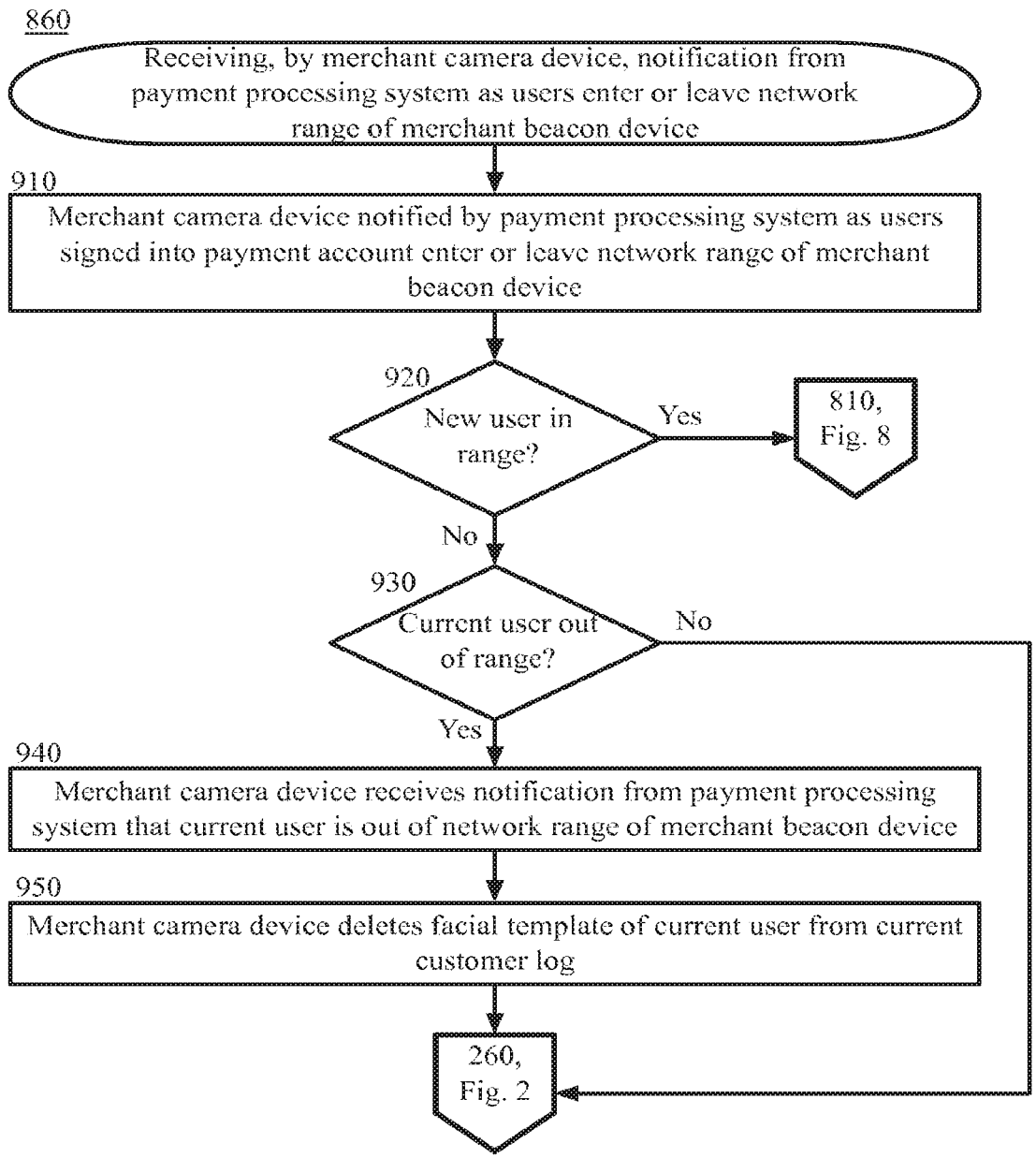
FIG. 9 is a block flow diagram depicting a method for receiving, by a camera device, notification from a payment processing system as users enter or leave a network range of a merchant beacon device, in accordance with certain example embodiments.

FIG. 9 is a block diagram depicting a method 860 for receiving, by a merchant camera device 140, notification from a payment processing system 160 as users 101 enter or leave a network range of a merchant beacon device 120, in accordance with certain example embodiments. The method 860 is described with reference to the components illustrated in FIG. 1.

In block 910, the merchant camera device 140 is notified by the payment processing system 160 as users 101 signed into a payment account enter or leave a network range of the merchant beacon device 120. For example, as previously discussed, when a user 101 carrying a user computing device 110 enters a threshold distance from a merchant beacon device 120, the merchant beacon device 120 or the user computing device 110 of the user 101 are able to detect the other device and establish a wireless network 120 connection between the two devices at the merchant system location. In this example, the merchant beacon device 120 transmits the merchant beacon identifier corresponding to the merchant beacon device 120 over the wireless network 120 to the user computing device 110. For example, the merchant beacon device 120 transmits the merchant beacon identifier to the user computing device 110 via a Wi-Fi, Bluetooth, BLE, or NFC wireless communication network 120. In this example, the user computing device 110 retransmits the received merchant beacon identifier to the payment processing system 160 along with a user 101 account identifier identifying the user 101.

In block 920, the merchant camera device 140 determines whether a new user 101 is in range of the merchant beacon device 120. For example, if the payment processing system 160 receives a new user 101 account identifier in addition to the same merchant beacon identifier, the payment processing system 160 may determine that a new user 101 is in range of the merchant beacon device 120. In this example, the payment processing system 160 may infer that the new user 101 has entered the merchant location based on receipt of the new user 101 account identifier. In another example, if the payment processing system 160 does not receive any new user 101 account identifiers along with the same merchant beacon identifier within a threshold length of time, the payment processing system 160 may determine that no new users 101 have entered the network 120 range of the merchant beacon device 120.

If a new user 101 is in range of the merchant beacon device 120, the method 860 proceeds to block 830 in FIG. 8. For example, the payment processing system 160 receives a new user 101 account identifier in addition to the same merchant beacon identifier. In this example, the payment processing system 160 infers that the new user 101 has entered the merchant location based on receipt of the new user 101 account identifier and the same merchant beacon identifier as previously received from the first user 101.

Returning to FIG. 8, in block 810, the payment processing system 160 extracts a facial template associated with the new user 101 account identifier. In an example embodiment, the payment processing system 160 transmits the facial template to the appropriate one or more merchant camera devices 140 and the one or more merchant camera devices 140 add the new user's 101 facial template to the current customer log according to the example method previously described in method 250 in FIG. 8.

Returning to FIG. 9, in block 920, if there is a not a new user 101 in range of the merchant beacon device 120, the method 860 proceeds to block 930. For example, the payment processing system 160 does not receive any new user 101 account identifiers along with the same merchant beacon identifier within a threshold length of time and determines that no new users 101 have entered the network 120 range of the merchant beacon device 120.

In block 930, the merchant camera device 140 determines whether a current user 101 has moved out of range of the merchant beacon device 120. In an example embodiment, the user computing device 110 continues to receive from the merchant beacon identifier from the merchant beacon device 120 and retransmit the merchant beacon identifier along with the user 101 account identifier to the payment processing system 160. In this example embodiment, the user computing device 110 may periodically transmit information comprising the merchant beacon identifier and user 101 account identifier to the payment processing system 160 as long as the user computing device 110 continues to detect the merchant beacon device 120 and receive the merchant beacon device 120 identifier via periodic scans. For example, the user computing device scans for the merchant veacon device 120 every five seconds. In another example embodiment, the user computing device 110 may periodically transmit information comprising the merchant beacon identifier and user 101 account identifier to the payment processing system 160 as long as the user computing device 110 maintains a wireless network 120 connection with the merchant beacon device 120. For example, the user computing device 110 may transmit this information to the payment processing system 160 at every five seconds. In this example embodiment, if the payment processing system 160 ceases to receive the information from the user computing device for a predefined number of intervals, the payment processing system 160 may determine that the corresponding user 101 has moved out of range of the merchant beacon device. In this example embodiment, if the payment processing system 160 continues to receive the information transmitted by the user computing device 110 at the expected intervals, the payment processing system 160 determines that the user 101 is still in network 120 range of the merchant beacon device 120.

If no current user 101 has moved out of range of the merchant beacon device 120, the method 860 proceeds to block 260 in FIG. 2. For example, the payment processing system 160 continues to receive the merchant beacon identifier and user 101 account identifier transmitted by the user computing device 110 at the expected intervals and determines that the user 101 is still in network 120 range of the merchant beacon device 120.

Returning to block 260, in FIG. 2, the user 101 initiates a transaction at the merchant POS device 130.

Returning to FIG. 9, in block 930, if a current user 101 has moved out of range of the merchant beacon device 120, the method 860 proceeds to block 940.

In block 940, the merchant camera device 140 receives a notification from the payment processing system 160 that a current user 101 is out of network range of the merchant beacon device 120. In another example embodiment, the merchant camera device 140 receives a notification from the payment processing system 160 that the user computing device 110 associated with the current user 101 has stopped sending notifications to the payment processing system 160 comprising the merchant beacon device 120 identifier. For example, the merchant camera device 140 receives the user 101 account identifier associated with the current user 101 associated with a user computing device 110 that is either out of network range or has stopped transmitting notifications comprising the merchant beacon device 120 identifier to the payment processing system 160, accesses the current customer log, and finds an entry corresponding to the current user 101. For example, the current customer log is maintained by the payment processing system 160 and the merchant camera device 140 accesses the current customer log over the network 120 by communicating with the payment processing system 160. In another example embodiment, the payment processing system 160 does not transmit a notification to the merchant camera device 140 that the current user 101 is out of network range. In this example embodiment, the payment processing system 160 accesses the current customer log and deletes the facial template of the current user 101 from the current customer log.

In block 950, the merchant camera device 140 deletes the facial template of the current user 101 from the current customer log. For example, the current customer log comprises a table and the merchant camera device 140 deletes or requests the deletion of an entry or row corresponding to data associated with the current user 101 for which the merchant camera device 140 received the notification. In another example embodiment, the payment processing system 160 accesses the current customer log and deletes the facial template of the current user 101 from the current customer log.

From block 950, the method 860 proceeds to block 260, in FIG. 2.

Returning to FIG. 2, in block 260, the user 101 initiates a transaction at the merchant point of sale device 130. The method for initiating, by a user 101, a transaction at a merchant point of sale device 130 is described in more detail hereinafter with reference to the method 260 described in FIG. 10. In the example embodiments described herein, the user 101 initiates a "hands free transaction" at the merchant POS device 130. An example hands free transaction does not require any interaction with the user computing device 110 on the part of the user 101. In another example, a hands free transaction requires only minimal interaction with the user computing device 110 by the user 101.

Figure 10:
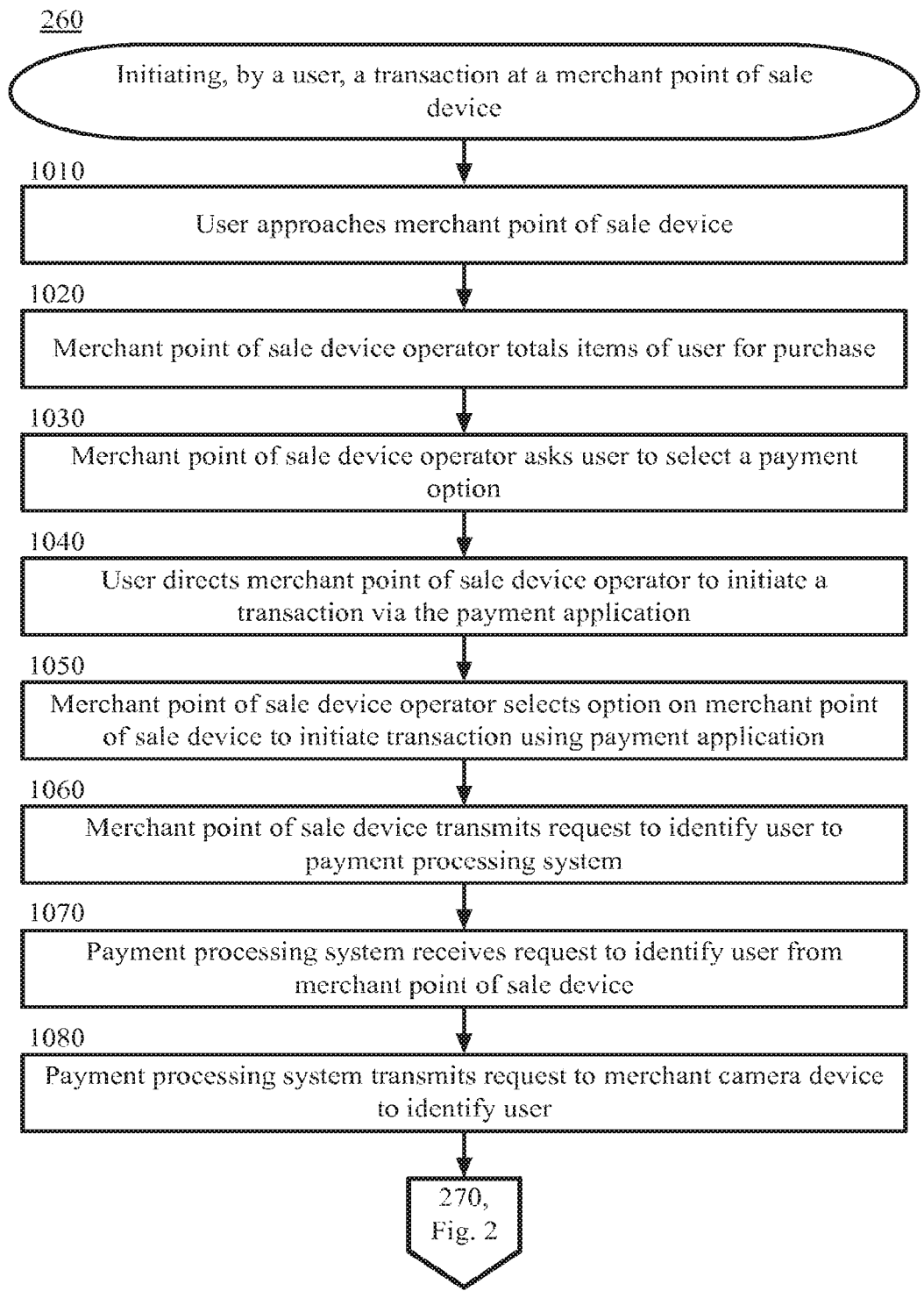
FIG. 10 is a block flow diagram depicting a method for initiating, by a user, a transaction at a merchant point of sale device, in accordance with certain example embodiments.

FIG. 10 is a block diagram depicting a method 260 for initiating, by a user 101, a transaction at a merchant point of sale device 130, in accordance with certain example embodiments. The method 260 is described with reference to the components illustrated in FIG. 1.

In block 1010, the user 101 approaches the merchant point of sale device 130. In an example embodiment, at a time prior to approaching the merchant POS device 130, the user 101 browses the merchant system location and selects one or more items to purchase. In this example embodiment, the user 101 may collect the one or more items and carry, or otherwise transport via physical basket or shopping cart, the one or more items to the merchant POS device 130.

In block 1020, the merchant point of sale device 130 operator 102 totals the items of the user 101 for purchase. In an example embodiment, the merchant POS device operator 102 scans barcodes attached to the one or more items or otherwise enters descriptions and prices associated with the one or more items into the merchant POS device 130. In an example embodiment, after scanning or manually entering the items into the merchant POS device 130, the merchant POS device operator 102 actuates an object on the user interface 135 of the merchant POS device 130 to order the merchant POS device 130 to total the items. In an example embodiment, the merchant POS device 130 displays, via the user interface 135, the total to the user 101.

In block 1030, the merchant point of sale device 130 operator asks the user 101 to select a payment option. In an example embodiment, the merchant POS device 130 displays one or more payment options that the user 101 may select to use in a transaction. Example payment options may comprise payment via a payment application 113 associated with the payment processing system 160, payment by cash, payment by check, payment by credit card, payment by debit card, and/or any other means of payment that the merchant system can or is willing to accept for payment from the user 101. In an example embodiment, the one or more payment options are displayed as objects on the user interface 135 and are selectable by the merchant POS device operator 102 in response to the user 101 directing the merchant POS device 102 operator to make a selection.

In another example embodiment, the payment processing system 160 or merchant camera device 140 transmits a notification to the merchant point of sale device 140 that the user 101 is able to initiate a transaction via the payment application 113. In this example embodiment, the merchant point of sale device 140 notifies the merchant point of sale device 140 operator that the user 101 is able to participate in transaction using the payment application 113. In this example embodiment, the merchant point of sale device 140 operator asks the user 101 to confirm whether the user 101 wants to initiate a transaction using the payment application 113.

In block 1040, the user 101 directs the merchant point of sale device operator 102 to initiate a transaction via the payment application 113. In an example embodiment, in response to receiving a verbal request from the user 101 to select the payment application 113 as a payment option, the merchant POS device operator 102 actuates an object on the user interface 135 of the merchant POS device 130 corresponding to the payment application 113 payment option.

In block 1050, the merchant point of sale device operator 102 selects an option on the merchant point of sale device 130 to initiate a transaction using the payment application 113. In an example embodiment, the merchant POS device 130 displays a confirmation screen after the merchant POS device operator 102 selects an option to initiate a transaction using the payment application 113. An example confirmation screen may display information summarizing the potential transaction and comprising one or more of a transaction total, a description of the one or more items being purchased by the user 101, and a indication that the user 101 selected the payment application 113 as the method of payment for the transaction. An example confirmation screen may further display options to confirm the transaction or cancel the transaction. In an example embodiment, the user 101 reviews the confirmation screen, determines that the information displayed on the confirmation screen is correct, determines to continue with the transaction, and directs the merchant POS device operator 102 to select the option to confirm the transaction via the user interface 135.

In another example embodiment, the user 101 decides to abandon the transaction because the information is incorrect or because the user 101 changed his mind and decided not to purchase the items. In yet another example embodiment, the confirmation screen further comprises an option to edit the transaction details. In this example embodiment, the merchant POS device operator 102, upon direction of the user 101, may select the option to edit the transaction details and may then edit, add, or delete one or more of the items in the transaction or edit payment details or payment methods for the transaction.

In block 1060, the merchant point of sale device 130 transmits a request to identify the user 101 to the payment processing system 160. In an example embodiment, the merchant point of sale device transmits a request to process a transaction along with the request to identify the user 101.

For example, at this point, the payment processing system 160 is aware that one or more users 101 are physically present in the merchant system location based on the current customer log maintained by the payment processing system and accessible and editable by the merchant camera device 120. Additionally, the payment processing system 160 is aware that a user 101 has initiated a transaction with the payment application 113 payment method based on the request to process the transaction received from the merchant POS device 130. However, the payment processing system 160 may not be aware of exactly which user 101 requested to process the hands free transaction involving the payment application 113.

In block 1070, the payment processing system 160 receives the request to identify the user 101 from the merchant point of sale device 130. For example, the payment processing system 160 receives the request to identify the user and the request to process the transaction over the network 120.

In block 1080, the payment processing system 160 transmits a request to the merchant camera device 140 to identify the user 101. For example, the payment processing system 160 transmits the request to identify the user to the merchant camera device 140 over the network 120. In another example embodiment, the merchant camera device 140 has already communicated the identity of the user 101 to the payment processing system 160 or to the merchant point of sale device 130 and the payment processing system 160 does not need to transmit a request to the merchant camera device 140 to identify the user 101.

From block 1080, the method 260 proceeds to block 270 in FIG. 2.

Returning to FIG. 2, in block 270, the merchant camera device 140 identifies the user 101 via facial recognition. The method for identifying, by a merchant camera device 140, a user 101 via facial recognition is described in more detail hereinafter with reference to the method 270 described in FIG. 11.

Figure 11:
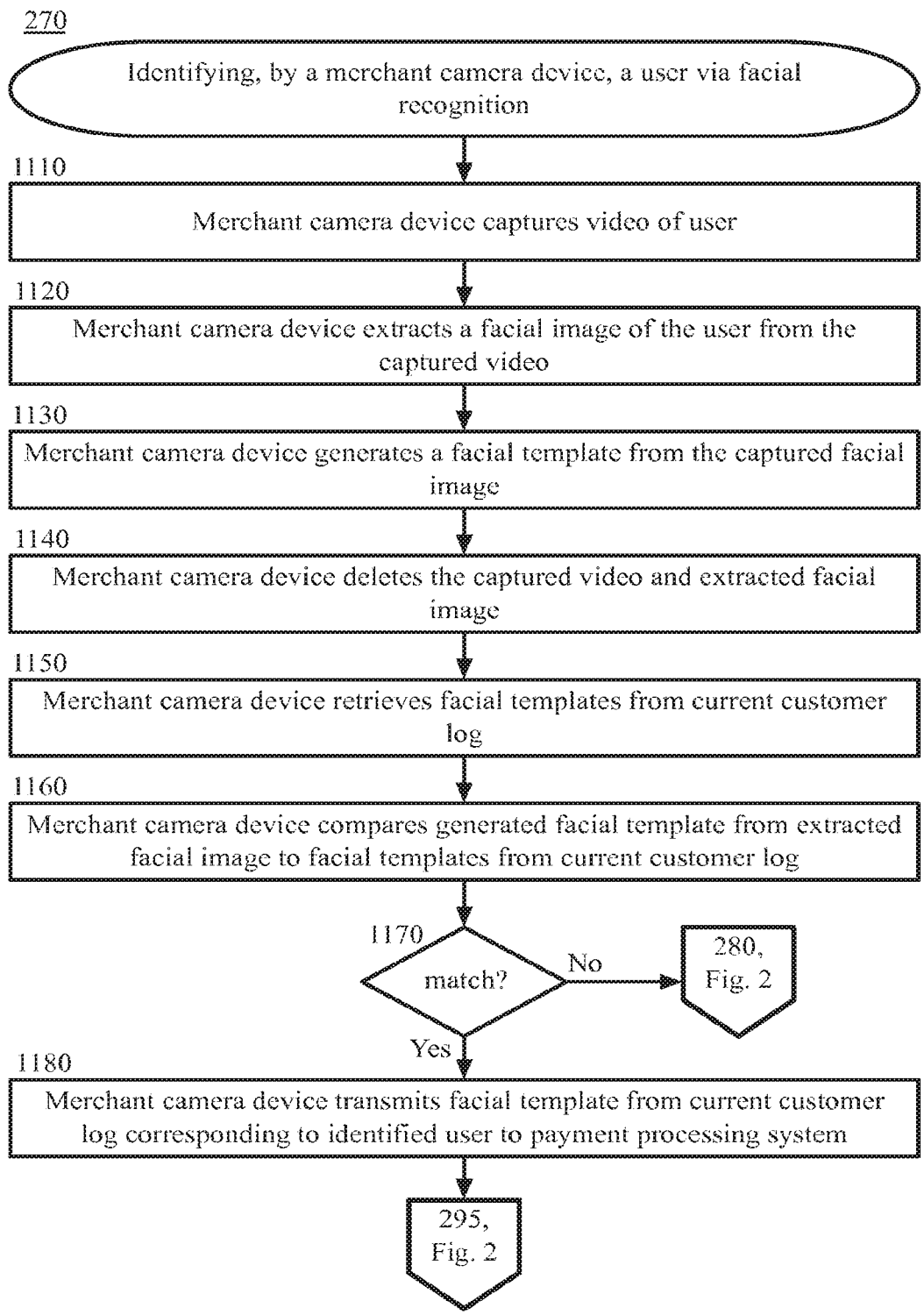
FIG. 11 is a block flow diagram depicting a method for identifying, by a camera device, a user via facial recognition, in accordance with certain example embodiments.

FIG. 11 is a block diagram depicting a method 270 for identifying, by a merchant camera device 140, a user 101 via facial recognition, in accordance with certain example embodiments. The method 270 is described with reference to the components illustrated in FIG. 1.

In block 1110, the merchant camera device 140 captures video of the user 101. In an example embodiment, in response to receiving a request to identify the user 101, the merchant camera device 140 activates the camera module 147 to begin to capture a video of the surroundings of the merchant camera device 140. In an example embodiment, the merchant POS device 130 captures a video feed of the user's 101 face. In another example embodiment, the merchant camera device 140 continuously captures, but does not record, a video feed of its surroundings. In this example embodiment, when the merchant camera device 140 receives a request to identify the user 101 from the payment processing system 160, the merchant camera device beings to record the video feed for a threshold amount of time. In an example embodiment, the user 101 may be moving during the period in which the merchant camera device 140 records the video feed. In an example embodiment, a processor 143 of the merchant camera device 140 extracts a facial image by determining a particular frame of the video feed and area of the instance of the video feed corresponding to the face of the user.

In block 1120, the merchant camera device 140 extracts a facial image of the user 101 from the captured video. In an example embodiment, the merchant camera device 140 determines a frame of the captured video to provide an image of the user's 101 face and extracts the frame of the captured video comprising the facial image of the user 101.

In certain other example embodiments, the merchant camera device 140 determines a frame of the captured video to provide an image of the faces of a plurality of users 101. For example, the frame comprises an image of the face of a first user 101, a second user 101, and a third user 101 at different locations in the image. In this example, one merchant camera device 140 may capture video of an environment corresponding to an area in the proximity of multiple merchant POS devices 130. In this example embodiment, the merchant camera device 140 may determine to which particular merchant POS device 130 each of the plurality of faces of the corresponding plurality of users 101 in the extracted image.

In an example embodiment, in which a merchant camera device 140 is mounted at an angle parallel to a plurality of adjacent merchant POS devices 130, the field of view of the merchant camera device 140 may be divided into bounding boxes such that each bounding box is assigned to a particular merchant POS device 130. In this example embodiment, since one or more users 101 may be situated between any two adjacent merchant POS devices 130, the bounding boxes may overlap. In this example embodiment, each bounding box is assigned to at most two adjacent merchant POS devices 130. In this example embodiment, in which the merchant camera device 140 is mounted parallel to a plurality of adjacent merchant POS devices 130, the size of a detected facial image of a user 101 is directly proportional to the distance the user 101 is from a merchant POS device 130 detected in the image. In this example embodiment, the merchant camera device 140 assigns each detected facial image to one or two particular merchant POS devices 130 based on the position of the facial image relative to the bounding boxes.

In another example embodiment, the merchant camera device 140 is mounted at an angle that is not parallel to a plurality of adjacent merchant POS devices 130. In this example embodiment, the merchant camera device 140 may be able to monitor an environment comprising a greater number of adjacent merchant POS devices 130 than the example embodiment in which the merchant camera device 140 is mounted parallel to adjacent merchant POS devices 130. In this example embodiment, however, the size of a detected facial image is not proportional to the distance between a merchant POS terminal detected in the image and the detected facial image. In this example embodiment, the merchant camera device 140 assigns each detected facial image to one or two particular merchant POS devices 130 based on the position of the facial image relative to the bounding boxes.

In block 1130, the merchant camera device 140 generates a facial template from the captured facial image. In an example, the facial template is of a predetermined size, for example, a 128-byte facial template. In an example, the payment processing system 160 generates a facial template comprising a computer code representation of the digital facial image. For example, the facial template may describe key features of the facial image of the user 101, such as shape, color, line, value, space, form, texture, or other useful or relevant feature of the image or of particular regions of the image. In another example, the facial template is generated by processing the facial image through a convolutional neural network. In an example embodiment, the merchant camera device 140 stores the generated facial template in a data storage unit 146 associated with the merchant camera device 140. For example, the merchant camera device 140 database may comprise a log of facial templates of current customers wherein the merchant camera device 140 stores the generated facial template.

In certain other example embodiments, the merchant camera device 140 continuously captures a video feed of its surroundings as users 101 enter and leave the vicinity of one or more merchant POS devices 130 over the course of a certain time period. In this example embodiment, the merchant camera device 140 processor 147 is able to continuously monitor the incoming video feed to detect faces from extracted frames of the video feed. In this example embodiment, the merchant camera device 140, each time the processor 147 detects the presence of one or more faces in the video feed, the merchant camera device 140 extracts a frame of the video feed comprising one or more facial images of one or more corresponding detected faces and creates facial templates based on the extracted one or more facial images. In this example embodiment, the merchant camera device 140 stores facial templates in the log of facial templates of current customers as they are generated. In this example embodiment, as the merchant camera device 140 generates a subsequent facial templates, the merchant camera device 140 determines whether the generated subsequent facial template is similar to within a threshold compared to any of the facial templates already stored in the log of facial templates of current customers. If the generated subsequent facial template is similar to within a threshold to any of the facial templates already stored in the log, the merchant camera device 140, after associating the facial template to one or two particular merchant POS devices 130 based on the position of the associated facial images in the extracted frame of the captured video, adds the facial template to the log of facial templates of current customers. If the generated subsequent facial template is not similar to within a threshold to any facial templates already stored in the log of facial templates of current customers, the merchant camera device 140 deletes or otherwise ignores and/or does nothing with the generated facial template. In this example embodiment, if the merchant camera device 140 determines that certain facial image is no longer in the field of the video feed, the corresponding facial template is deleted from the log of facial templates of current customers.

In block 1140, the merchant camera device 140 deletes the captured video and the extracted facial image. For example, the merchant camera device 140 does not store captured images or video. In this example, facial templates generated by the merchant camera device 140 comprise computer code representations of facial images of users 101. In this example, after generating a facial template or after a threshold time has passed after capturing video or images or extracting an image from a video, the merchant camera device 140 deletes any captured or extracted video or images.

In block 1150, the merchant camera device 140 retrieves facial templates from the current customer log. For example, the current customer log comprises facial templates received from the payment processing system 160 corresponding to all current users 101 whose associated user computing devices 110 are located within a network distance of a merchant beacon device 120.

In block 1160, the merchant camera device 140 compares the generated facial template from captured facial image to facial templates from the current customer log.

In block 1170, the merchant camera device 140 determines whether there is a match between the generated facial template and one of the facial templates from the current customer log. In this example embodiment, when the merchant camera device 140 determines a match between a first facial template in the log of facial templates of current customers and a second facial template the log of current customers, the merchant camera device 140 determines with which merchant one or two POS devices 130 the second facial template is associated. In this example embodiment, the merchant camera device 140 updates the entry of the second facial template in the log of current customers with an annotation assigning the second facial template to a particular one or two merchant POS devices 130. For example, as previously discussed, the facial image upon which the facial template was located within a bounding box of an area of the video or image corresponding to one or two particular merchant POS devices 130. In this example, when the merchant camera device 140 generates a facial template for the facial image, the merchant camera device 140 associates the generated facial template with the particular one or two merchant POS devices 130. For example, if the facial image was in a bounding box in front of a first merchant POS device 130, the resulting facial template may be associated with the first merchant POS device 130. In another example, if the facial image was in a bounding box between the first merchant POS deice 130 and a second, adjacent POS device 130, the resulting facial template may be associated with both the first merchant POS device 130 and the second merchant POS device 130.

If a facial template from the current customer log matches the generated facial template, the method 270 proceeds to block 1180. In another example embodiment, if a facial template from the current customer log matches a facial template from the log of facial templates of current customers, the method 270 proceeds to block 1180

In block 1180, the merchant camera device 140 transmits the facial template from the current customer log corresponding to the identified user to the payment processing system 160. For example, the transmitted facial template comprises an annotation assigning the facial template to a particular one or two merchant POS devices 130.

From block 1180, the method 270 proceeds to block 295 in FIG. 2. In this example embodiment, the payment processing system 160 identifies the user 101 requesting a transaction and a particular merchant POS device 130 to which the user 101 is assigned and may proceed with processing the transaction.

Returning to block 1170, if none of the facial templates from the current customer log matches the generated facial template, the method 270 proceeds to block 280 in FIG. 2. In another example embodiment, if none of the facial templates from the current customer log matches any of the facial templates from the log of facial templates of current customers, the method 270 proceeds to block 280 in FIG. 2.

Returning to block 280, in FIG. 2, the payment processing system 160 identifies the user 101 via voice recognition. In another example embodiment, the payment processing system 160 does not identify the user 101 via voice recognition and proceeds to identify the user 101 via challenge and response. For example, the merchant camera device 140 and/or payment processing system 160 is unable to identify the user via facial recognition and/or if the merchant camera device 140 and/or payment processing system 160 identify two or more users 101 via facial recognition. The method for identifying, by a payment processing system 160, a user 101 via voice recognition is described in more detail hereinafter with reference to the method 280 described in FIG. 12.

FIG. 12 is a block diagram depicting a method 280 for identifying, by a payment processing system 160, a user 101 via voice recognition, in accordance with certain example embodiments. The method 280 is described with reference to the components illustrated in FIG. 1.

In certain example embodiments, it may be necessary to identify a user 101 via voice recognition because the merchant camera device 140 and/or payment processing system 160 is not able to identify the user 101 based on facial recognition. For example, the merchant camera device 140 may be unable to extract an adequate facial image of the user 101 from the video feed to generate a facial template. In another example, the merchant camera device 140 is unable to find a match for the facial template of the user 101 in the current customer log. In yet another example, the merchant camera device 140 identifies a matching user 101 facial template in the current customer log, however, the identified user 101 facial template is assigned to two adjacent merchant POS devices 130. In this example, the user 101 may have to identify himself via voice recognition at the POS device 130 at which the user 101 initiates the transaction.

In block 1210, the merchant camera device 140 transmits a notice that the user 101 cannot be identified to the payment processing system 160. In another example embodiment, the merchant camera device 140 transmits a notice that the user 101 has been identified, however, that the merchant camera device 140 is unable to determine which of two adjacent merchant POS devices 130 the user 101 using in the transaction.

In block 1220, the payment processing system 160 retrieves audio templates corresponding to users 101 from the current customer log. As previously discussed, when a user 101 establishes an account with the payment processing system 160, the user 101 may submit an audio recording of the user's 101 voice to the payment processing system 160. In this example the payment processing system 160 establishes an audio template corresponding to the user 101 based on the received audio recording. In another example embodiments, the user 101 does not submit an audio recording to the payment processing system 160 at the time the user 101 establishes the user 101 account. In this other example embodiment, the payment processing system 160 does not have an audio template associated with the user 101 account and cannot verify the user 101 via voice recognition.

In block 1230, the payment processing system 160 transmits a request to the merchant system point of sale device 130 to record audio of the user 101. For example, the payment processing system 160 transmits the request over the network 120.

In block 1240, the merchant system point of sale device 130 displays the request for the user 101 to record audio. For example, the merchant system POS device 130 may display directions to the user 101 to record an audio recording. For example, the user 101 may be directed to speak the same words in the same intonation as the user 101 did when establishing the audio template with the payment processing system 160 at the time of setting up the user 101 account.

In block 1250, the merchant system point of sale device 130 records a voice input of the user 101 and transmits the voice input to the payment processing system 160. For example, the merchant POS device operator 102 may actuate an object on the user interface 135 to activate an audio module 131 to receive an audio input of the user 101, which the merchant system POS device 130 retransmits to the payment processing system 160 over the network 120. In an example embodiment, the merchant POS device 130 transmits a merchant POS device 130 identifier along with the retransmitted user 101 audio input.

In block 1260, the payment processing system 160 compares the received voice input against the retrieved audio templates corresponding to users 101 from the current customer log. For example, the payment processing system 160 receives the audio input of the user 101 from the merchant POS device 130 over the network 120.

In block 1270, the payment processing system 160 determines whether there is a match between the received voice input and one of the retrieved audio templates from the current customer log. In an example embodiment, the payment processing system 160 compares one or more features between the received voice input and each of the retrieved audio templates from the current customer log. In an example embodiment, if the similarity between the received voice input and a particular audio template exceeds a predefined threshold, the payment processing system 160 determines that the received voice input matches the particular audio template. In another example embodiment, if the similarity between the received voice input and the particular audio template is less than the predefined threshold, the payment processing system 160 determines that the received voice input does not match the particular audio template.

If an audio template from the current customer log matches the received voice input, the method 270 proceeds to block 1280. For example, the similarity between a particular audio template from the current customer log and the received audio recording of the user 101 exceeds a predefined threshold and the payment processing system 160 determines that there is a match.

In block 1280, the payment processing system 160 assigns the user 101 to the merchant point of sale device 130 in the current customer log. For example, the payment processing system 160 identifies the user 101 associated with the audio template that matches the received user 101 audio recording. Additionally, the payment processing system 160 identifies the merchant POS device 130 to which the user 101 should be assigned based on the merchant POS device 130 identifier received from the merchant POS device 130 with the user 101 audio recording.

From block 1290, the method 280 proceeds to block 295 in FIG. 2. For example, the payment processing system 160 successfully identifies the user 101 based on comparing the received user 101 recording against audio templates from the current customer log. In this example, the payment processing system 160 may continue to process the transaction involving the identified user 101.

Returning to block 1270, if none of the audio templates from the current customer log matches the received voice input, the method 280 proceeds to block 290 in FIG. 2. In another example embodiment, the merchant POS device 130 is unable to receive a audio recording of the user 101 or the received audio recording of the user 101 is inadequate and cannot be used to identify the user 101.

Returning to FIG. 2, in block 290, the user 101 is identified by the merchant system POS operator 102 via a challenge and a response. The method for identifying, by a merchant point of sale device operator 102, a user 101 via a challenge and a response is described in more detail hereinafter with reference to the method 290 described in FIG. 13.

Figure 13:
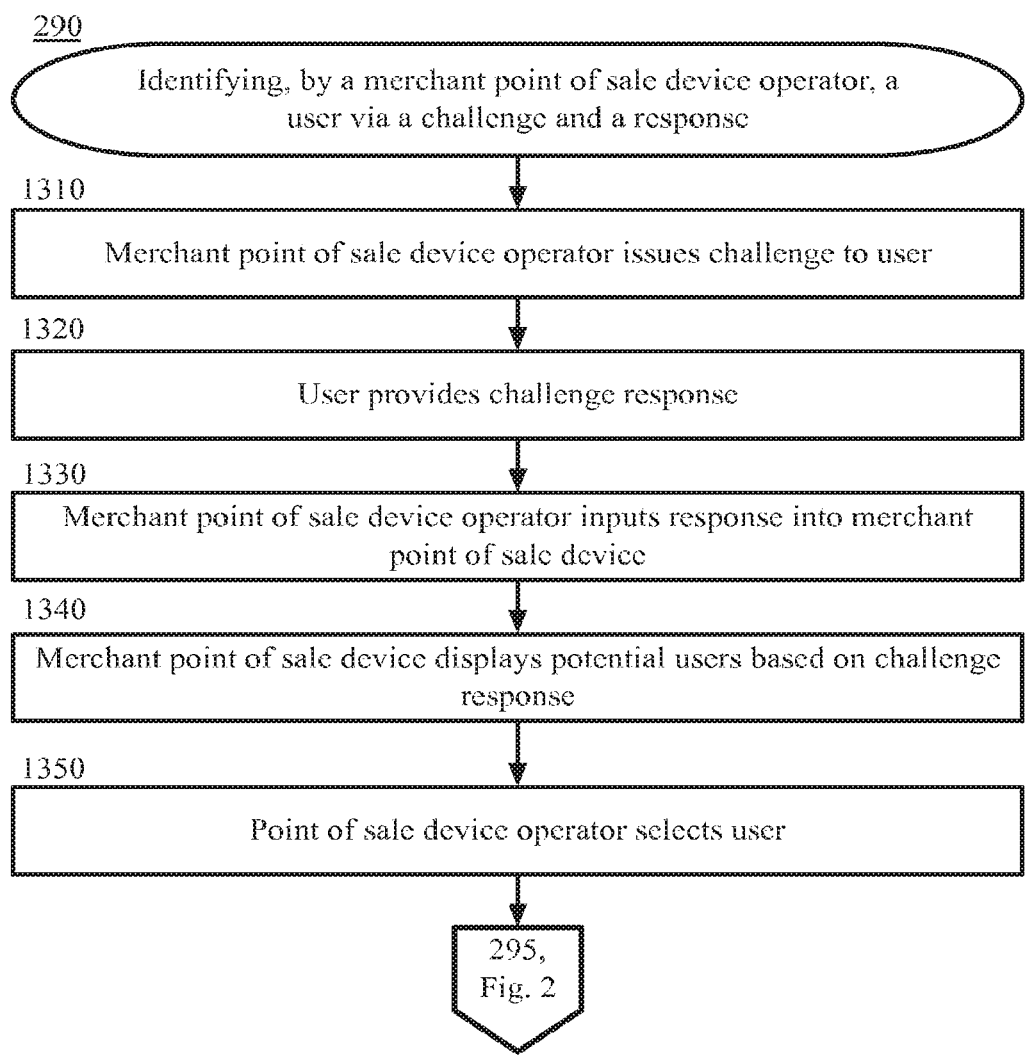
FIG. 13 is a block flow diagram depicting a method for identifying, by a merchant point of sale device operator, a user via a challenge and a response, in accordance with certain example embodiments.

FIG. 13 is a block diagram depicting a method 290 for identifying, by a merchant point of sale device operator 102, a user 101 via a challenge and a response, in accordance with certain example embodiments. The method 290 is described with reference to the components illustrated in FIG. 1.

In block 1310, the point of sale device operator 102 issues a challenge to the user 101. In an example, the merchant POS device operator 102 asks the user 101 for the initials of the user 101. In another example, the merchant POS device operator 102 asks the user 101 for the last four digits of the phone number of the user 101. In another example, the merchant POS device operator 102 asks the user 101 for a configured password. Any suitable challenge may be issued by the merchant POS device operator 102. In an example embodiment, the response to the challenge does not provide any secure or private information.

In block 1320, the user 101 provides a challenge response. As described in the example challenges, the responses may be the initials of the user 101, the last four digits of the phone number of the user 101, or a configured password. Any configured challenge response may be utilized. In certain embodiments, the response may be a spoken response, a hand gesture, a keypad entry, a display of an identification card, or any suitable response.

In block 1330, the point of sale device operator 102 inputs the response into the merchant point of sale device 130. The merchant POS device operator 102 inputs the challenge response of the user 101. In an example, if the user 101 indicates that the initials of the user 101 are "AC," then the merchant POS device operator 102 inputs "AC" into the payment application 133 of the merchant POS device 130. In an example, the user interface 135 of the merchant POS device 130 displays a request for an entry of the response of the user 101. The merchant POS device operator 102 enters the response via a virtual or physical keyboard, voice dictation, or in any suitable manner. In an alternate example, the user 101 enters the response into the user interface 135 of the merchant POS device 130.

In block 1340, the merchant point of sale device 130 displays potential users 101 based on the challenge response. The merchant POS device 130 displays potential users 101 based on the challenge response. A list of users 101 that are associated with the challenge response are displayed on the merchant POS device 130 to the merchant POS device operator 102. For example, if ten customers are in the vicinity of the merchant beacon device 120, then the merchant POS device 130 may have received from the payment processing system 160 a challenge response associated with each of the respective ten customers. When the merchant POS device 130 receives the challenge response input, only the potential users 101 that are associated with the challenge response are displayed to the merchant POS device operator 102.

In another embodiment, the merchant POS device 130 or the payment processing system 160 which processes the challenge, presents additional challenges until there is a single matching user 101 remaining.

In the example, if the merchant POS device operator 102 inputs "AC" as the initials of the user 101 associated with the transaction, then only the potential users 101 with those initials will be displayed to the merchant POS device operator 102 by the payment application 133. The payment application 133 accesses a database on the payment processing system 160 or another computing device and identifies the initials of the potential users 101 that have provided tokens. The payment application 133 identifies the one or more potential users 101 that have the initials "AC" and displays the identified user 101 accounts to the merchant POS device operator 102. In the example, two of the ten customers that are in the vicinity of the merchant beacon device 120 have the initials "AC." The user 101 accounts of the two customers are displayed to the merchant POS device operator 102.

In certain example embodiments, all of the nearby customers who have had tokens transmitted to the merchant POS device 130 are presented to the merchant POS device operator 102 and the merchant POS device operator 102 selects the appropriate user 101 account.

The payment application 133 may display a picture of the potential user 101 accounts that are presented to the merchant POS device operator 102. For example, each user 101 may associate a picture with a user 101 account. When the merchant POS device 130 presents the one or more potential user 101 accounts to the merchant POS device operator 102, the merchant POS device operator 102 may select the appropriate user 101 account based on the picture matching the user 101 conducting the transaction. Other identifying information may be presented instead of, or in addition to, a picture. For example, the name of the user 101 may be displayed and the merchant POS device operator 102 may identify the potential user 101 with that name. Any other suitable identifying information may be presented.

In block 1350, the merchant point of sale device operator 102 selects the user 101 account for use in a transaction. After identifying the displayed picture of the user 101, the merchant POS device operator 102 may input a selection of the user 101 by actuating a user interface 135 control associated with the picture, or by inputting the selection in any suitable manner. If the picture doesn't match any of the potential users, then the merchant POS device operator 102 may cancel the transaction, notify the user 101 of the discrepancy, or perform any other suitable action.

In an example, only a single user 101 account is presented in the list of potential users 101. If only a single user 101 account is identified, then the method may proceed after the merchant POS device operator 102 verifies that the displayed picture matches the user 101. If the picture doesn't match, then the merchant POS device operator 102 may cancel the transaction, notify the user 101 of the discrepancy, or perform any other suitable action.

From block 1350, the method 290 proceeds to block 295 in FIG. 2.

Returning to FIG. 2, in block 295, a transaction is processed. The method for processing a transaction is described in more detail hereinafter with reference to the method 290 described in FIG. 14.

Figure 14:
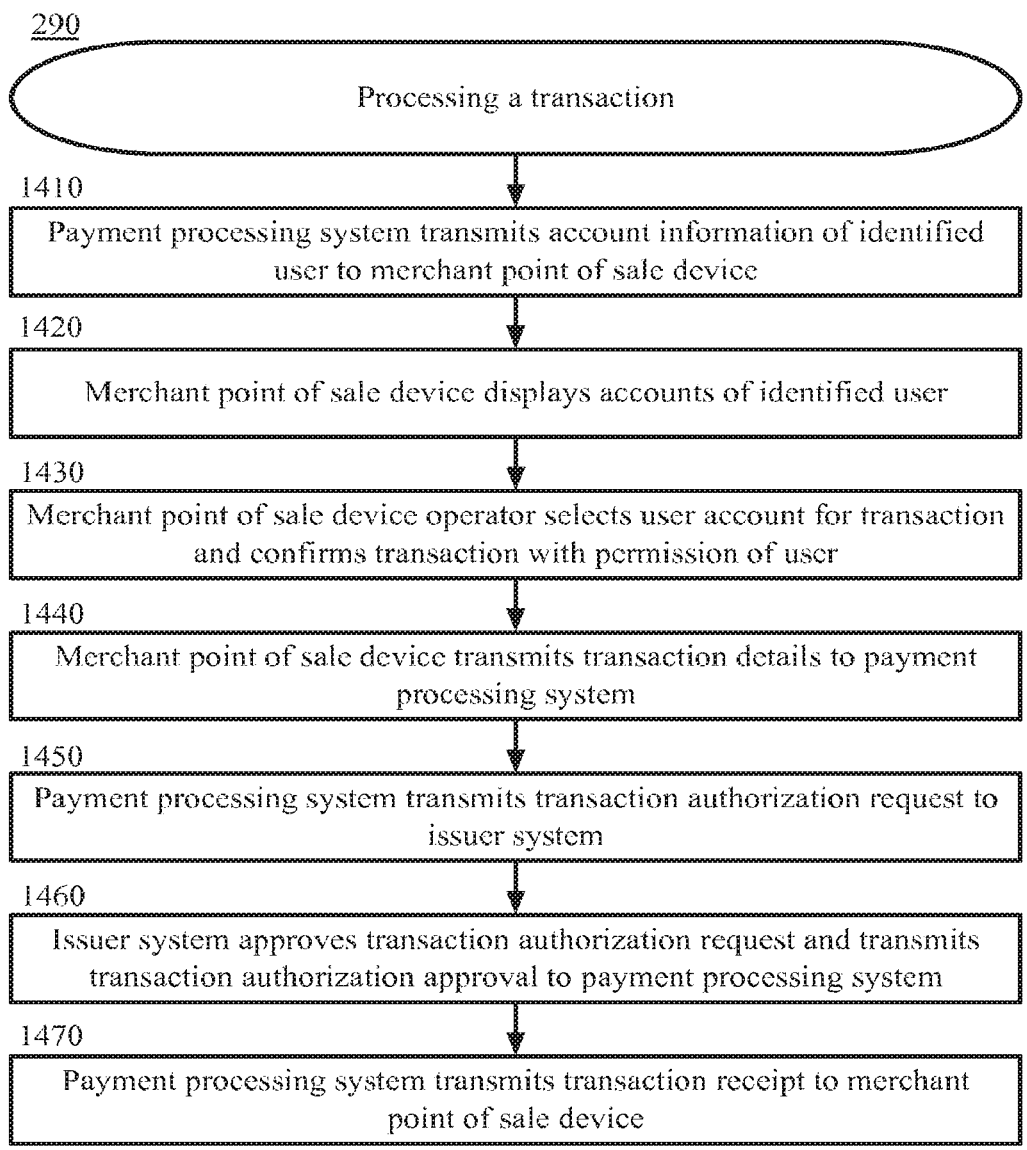
FIG. 14 is a block flow diagram depicting a method for conducting a transaction, in accordance with certain example embodiments.

FIG. 14 is a block diagram depicting a method 295 for processing a transaction, in accordance with certain example embodiments. The method 295 is described with reference to the components illustrated in FIG. 1.

In block 1410, the payment processing system 160 transmits account information of the identified user 101 to the merchant point of sale device 130. For example, the user 101 account with the payment processing system 160 comprises payment account information associated with one or more payment accounts of the user 101. An example payment account of the user 101 comprises a credit account, bank account, stored value account, gift card, merchant system charge account, or other relevant user 101 account. In an example embodiment, the merchant POS device 130 does not receive complete payment information for one or more of the user 101 payment accounts. For example, the payment information may be obfuscated or truncated. For example, the merchant POS device 130 may only receive abbreviated payment information sufficient for a user 101 to identify a payment account via the user interface 135.

In block 1420, the merchant point of sale device 130 displays accounts of the identified user 101. In an example embodiment, the merchant POS device 130 does not display complete account information of the user 101 on the user interface 135. For example, for a credit card account, the merchant POS device user interface 135 may display only the name associated with the credit card, last four digits of the credit card number, and the expiration date.

In block 1430, the merchant point of sale device operator 102 selects a user 101 account for transaction and confirms the transaction with permission of the user 101. For example, the user 101 views the account options directly displayed on the user interface 135 or listens to the merchant POS device operator 102 read the user 101 payment account options to the user 101. In an example embodiment, the user 101 selects a payment account option to use in the transaction. For example, the user 101 decides to use a credit card account. In an example embodiment, the user 101 communicates a selection of a payment account for use in the transaction to the merchant POS device operator 102. In an example embodiment, in response to receiving the user's 101 indication of the payment account, the merchant POS device operator 102 selects the payment account indicated by the user 101 on the merchant POS device user interface 135.

In block 1440, the merchant point of sale device 130 transmits transaction details to the payment processing system 160. For example, the merchant POS device 130 transmits transaction details comprising a transaction total, an account identifier of the merchant system, and the selection of the user 101 account payment option. In an example embodiment, the payment processing system 160 receives the transaction details over the network 120. In an example embodiment, the payment processing system 160 extracts payment account information from the user 101 account corresponding to the received selection of the user 101 payment account.

In block 1450, the payment processing system 160 transmits a transaction authorization request to an issuer system 150. In an example embodiment, the payment processing system 160 generates a transaction authorization request comprising user 101 payment account information, merchant system payment account information, and a total amount of the transaction. In an example embodiment, the payment processing system 160 receives the transaction authorization request from the payment processing system 160 via the network 120.

In block 1460, the issuer system 150 approves the transaction authorization request and transmits a transaction authorization approval to the payment processing system 160. In an example embodiment, the issuer system 150 subtracts the user's 101 current account balance from the user's 101 credit limit associated with the user's 101 credit account. In an example embodiment, if the different between the credit limit and the credit balance is a positive number greater than the total amount of the transaction, the issuer system 150 approves the transaction authorization. For example, the user 101 will not exceed his credit limit if the transaction were to be approved, therefore the issuer system 150 approves the transaction authorization request. In an example embodiment, the payment processing system 160 receives the transaction authorization approval from the issuer system 150. In another example embodiment, the payment processing system 160 receives a denial of the transaction authorization request in response to the issuer system 150 declining the transaction authorization request. In an example embodiment, if the issuer system 150 approves the transaction authorization request, the issuer system 150 credits the merchant system account and adds a charge to the user 101 credit account statement, bank account statement, or other appropriate statement.

In block 1470, the payment processing system 160 transmits a transaction receipt to the merchant point of sale device 130. For example, the payment processing system 160 transmits a confirmation of the approval of the transaction or a notice of a declined transaction to the merchant POS device 130 over the network 120. In an example embodiment, the merchant POS device 130 prints a receipt comprising a summary of a successful or unsuccessful transaction via a printer device that is a component of or otherwise communicatively coupled to the merchant POS device 130. In another example embodiment, the payment processing system 160 may transmit a transaction receipt to the user computing device 110 to be displayed on the user computing device. In yet another example embodiment, the merchant POS device 130 transmits a transaction receipt to the user computing device 110 to be displayed on the user computing device.

Other Example Embodiments

FIG. 15 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to identify users at locations, comprising:

receiving, by one or more processors at a location and from one or more computing devices, one or more templates, each template associated with a corresponding user associated with a corresponding user computing device that received a broadcasted identifier at the location and retransmitted the broadcasted identifier to the one or more computing devices, each template comprising a representation of at least one of a respective facial image or a respective audio recording of the corresponding user;

obtaining, by the one or more processors, at least one of a facial image or an audio recording of a particular user at the location;

determining, by the one or more processors, a similarity between the at least one of the facial image or the audio recording of the particular user at the location and each of the one or more templates; and identifying, by the one or more processors, a particular template of the one or more templates as corresponding to the at least one of the facial image or the audio recording of the particular user based on a determined similarity between the at least one of the facial image or the audio recording and the particular template satisfying a threshold indicating that the particular template corresponds to the at least one of the facial image or the audio recording of the particular user.

2. The computer-implemented method of claim 1, wherein:

the location is a merchant location;

the one or more processors are part of a merchant system at the merchant location; and the one or more computing devices are remote from the merchant location.

3. The computer-implemented method of claim 1, further comprising:

generating, by the one or more processors, a template for the particular user based on the at least one of the facial image or the audio recording of the particular user at the location.

4. The computer-implemented method of claim 1, further comprising:
receiving, by the one or more processors, a request to identify a first user; and
transmitting, by the one or more processors, a response to the request to identify the first user, the response include an indication of the particular user.

5. The computer-implemented method of claim 4, wherein:
the request to identify the first user is received from a merchant system point of sale device; and
the response to the request to identify the first user is transmitted to the merchant system point of sale device.

6. The computer-implemented method of claim 5, further comprising, processing, by the merchant system point of sale device, a transaction using payment account information associated with the particular user.

7. The computer-implemented method of claim 1, further comprising:
capturing, by one or more image capture devices, a video feed of an environment, wherein the environment includes the particular user located in proximity to one or more merchant system point of sale devices; and
extracting, by the one or more processors, the at least one of the facial image or the audio recording of the particular user from the video feed.

8. The computer-implemented method of claim 7, further comprising, by the one or more processors:
determining, based on a frame of the video feed, a position of a face of the particular user and positions of each of the one or more merchant system point of sale devices at a location associated with a merchant system; and
assigning, based on distances between the face of the particular user and each of the one or more merchant system point of sale devices in the frame of the video feed, the particular user to a particular point of sale device of the one or more merchant system point of sale devices;
wherein an indication of an identity of the particular user further comprises an identifier of the particular point of sale device and an indication of an assignment of the particular user to the particular point of sale device.

9. A computer-implemented method to identify users at locations, comprising:
receiving, by one or more processors and from a user computing device at a location of a merchant system, an account identifier of a user and a merchant identifier, wherein the user computing device received the merchant identifier from a broadcast at the location of the merchant system and retransmitted the merchant identifier to the one or more processors;
identifying the location of the merchant system associated with the merchant identifier;
adding a template corresponding to the account identifier of the user to a current customer log comprising templates of users currently at the location of the merchant system, the template comprising a representation of at least one of a respective facial image or a respective audio recording of the user;
transmitting, to the merchant system at the location, the current customer log, wherein the merchant system identifies the user based on a determined similarity between the at least one of the respective facial image or the respective audio recording of the user from the template and at least one of a facial image or an audio recording of the user at the location satisfying a threshold indicating that the template corresponds to the at least one of the respective facial image or the respective audio recording of the user.

10. The computer-implemented method of claim 9, wherein:
the location is a merchant location; and
the one or more processors are remote from the merchant location.

11. The computer-implemented method of claim 9, wherein:
the merchant identifier is a merchant beacon identifier received from a merchant beacon device located at the location of the merchant system.

12. The computer-implemented method of claim 9, further comprising, by the one or more processors:
determining that the user computing device is no longer in proximity of the merchant system; and
removing the template of the user from the current customer log.

13. The computer-implemented method of claim 12, wherein determining that the user computing device is no longer in proximity of the merchant system comprises determining that a subsequent transmission of the account identifier and the merchant identifier is not received from the user computing device within a threshold amount of time.

14. The computer-implemented method of claim 9, further comprising, by the one or more processors:
receiving a particular template associated with an identified user, a transaction total, and a merchant account identifier from a merchant computing device at the location of the merchant system;
determining, based on the particular template, an account identifier associated with the identified user;
transmitting, to a point of sale device, one or more payment account information items associated with the account identifier;
receiving, from the point of sale device, an indication of a selection of a particular payment account information item for use in a transaction;
generating a transaction authorization request comprising the transaction total, the merchant account identifier, and the particular payment account information item;
transmitting the transaction authorization request to an issuer system associated with the particular payment account information item;
receiving, from the issuer system, data comprising an authorization of the transaction authorization request; and
transmitting, to the point of sale device for display on the point of sale device, a message regarding authorization of the transaction.

15. One or more non-transitory computer-readable media having computer-readable instructions embodied thereon that when executed by one or more processors cause the one or more processors to perform operations, the operations comprising:
receiving, by the one or more processors at a location and from one or more computing devices, one or more templates, each template associated with a corresponding user associated with a corresponding user computing device that received a broadcasted identifier at the location and retransmitted the broadcasted identifier to the one or more computing devices, each template comprising a representation of at least one of a respective facial image or a respective audio recording of the corresponding user;

obtaining at least one of a facial image or an audio recording of a particular user at the location;

determining a similarity between the at least one of the facial image or the audio recording of the particular user at the location and each of the one or more templates; and identifying a particular template of the one or more templates as corresponding to the at least one of the facial image or the audio recording of the particular user based on a determined similarity between the at least one of the facial image or the audio recording and the particular template satisfying a threshold indicating that the particular template corresponds to the at least one of the facial image or the audio recording of the particular user.

16. The one or more non-transitory computer-readable media of claim 15, wherein:

the location is a merchant location;

the one or more processors are part of a merchant system at the merchant location; and the one or more computing devices are remote from the merchant location.

17. The one or more non-transitory computer-readable media of claim 15, wherein the operations further comprise:

generating a template for the particular user based on the at least one of the facial image or the audio recording of the particular user at the location.

18. The one or more non-transitory computer-readable media of claim 15, wherein the operations further comprise:

receiving a request to identify a first user; and transmitting a response to the request to identify the first user, the response includes an indication of the particular user.

19. The one or more non-transitory computer-readable media of claim 18, wherein:

the request to identify the first user is received from a merchant system point of sale device;

the response to the request to identify the first user is transmitted to the merchant system point of sale device; and the operations further comprise, processing, by the merchant system point of sale device, a transaction using payment account information associated with the particular user.

20. The one or more non-transitory computer-readable media of claim 15, wherein the operations further comprise:

determining, based on a frame of a video feed, a position of a face of the particular user and positions of each of one or more point of sale devices at a location associated with a merchant system; and assigning, based on distances between the face of the particular user and each of the one or more point of sale devices in the frame of the video feed, the particular user to a particular point of sale device of the one or more point of sale devices, wherein an indication of an identity of the particular user further comprises an identifier of the particular point of sale device and an indication of an assignment of the particular user to the particular point of sale device.

* * * * *